United States Patent
Kelly et al.

(10) Patent No.: US 10,909,999 B2
(45) Date of Patent: Feb. 2, 2021

(54) MUSIC SELECTIONS FOR PERSONAL MEDIA COMPOSITIONS

(71) Applicant: Apple Inc., Cupertino, CA (US)

(72) Inventors: Patrick H. Kelly, San Francisco, CA (US); Sabrine Rekik, San Francisco, CA (US); Eric Circlaeys, Los Gatos, CA (US); Zachary H. Smith, Palo Alto, CA (US); Christopher J. Moulios, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/750,357

(22) Filed: Jan. 23, 2020

(65) Prior Publication Data

US 2020/0381005 A1    Dec. 3, 2020

Related U.S. Application Data

(60) Provisional application No. 62/855,658, filed on May 31, 2019.

(51) Int. Cl.
*G10L 21/10* (2013.01)
*G06F 16/432* (2019.01)
*G10G 1/00* (2006.01)
*G06F 16/435* (2019.01)
*G06F 16/438* (2019.01)

(52) U.S. Cl.
CPC ............ *G10L 21/10* (2013.01); *G06F 16/433* (2019.01); *G06F 16/435* (2019.01); *G06F 16/4393* (2019.01); *G10G 1/00* (2013.01)

(58) Field of Classification Search
CPC .... G06F 16/40; G06F 16/435; G06F 16/4393; G06F 16/433; G10L 21/10; G10G 1/00
See application file for complete search history.

(56) References Cited

U.S. PATENT DOCUMENTS

| | | | |
|---|---|---|---|
| 2009/0125136 A1* | 5/2009 | Akiyama | G06F 16/433 700/94 |
| 2013/0290348 A1* | 10/2013 | Jung | G06F 16/40 707/748 |
| 2015/0243325 A1* | 8/2015 | Pacurariu | H04N 9/8042 386/227 |
| 2015/0339301 A1* | 11/2015 | Paalborg | G06F 16/44 715/716 |
| 2016/0234184 A1* | 8/2016 | Liu | G06F 16/433 |

* cited by examiner

*Primary Examiner* — Fan S Tsang
*Assistant Examiner* — David Siegel
(74) *Attorney, Agent, or Firm* — Invoke

(57) ABSTRACT

In some implementations, a computing device can generate personalized music selections to associate with any collections of visual media (e.g., photos and videos) stored on the computing device. A user may prefer particular genres of music and listen to some genres more frequently than others. The computing device can create measures of the user's genre preferences and use these measures to select music that is preferred by the user and music that may be significant or relevant to the particular collection of visual media. The computing device may also determine music that was being played when and where the visual media were being created. The computing device may store the visual media and music items in association with each other. The computing device may generate composite media items that combine the visual media and music items. When the visual media are viewed, the selected music item is also played.

33 Claims, 13 Drawing Sheets

MUSIC SELECTIONS FOR PERSONAL MEDIA COMPOSITIONS

TECHNICAL FIELD

The disclosure generally relates to selecting music for personal media items, and more specifically to creating personalized associations between visual media items and music items on a computing device.

BACKGROUND

Users of modern computing devices often create collections of photos or videos on those computing devices related to a particular event or time period. Relatedly, these users may also use these computing devices to play music, songs, or any audio media. The photos, videos, or music may have emotional significance or personal relevance to the users.

SUMMARY

In some implementations, a computing device can generate personalized music selections to associate with any collections of visual media (e.g., photos and videos) stored on the computing device. A user may prefer particular genres of music and listen to some genres more frequently than others. The computing device can create measures of the user's genre preferences and use these measures to select music that is preferred by the user and music that may be significant or relevant to the particular collection of visual media captured at various moments in time. The computing device may also determine music that was being played when and where the visual media were being created. The computing device may store the visual media and music items in association with each other. The computing device may generate composite media items that combine the visual media and music items. In some embodiments, the composite media item may represent a memory of the user's experiences at the time the visual media items were captured. When the visual media are viewed, the selected music item is also played.

Particular implementations provide users with more personalized music selections to accompany the users' visual media. For example, a person viewing a collection of photos may hear music that is relevant to those photos (e.g., relevant to the scene or people in the photos) and/or preferred by the user. The personalized music selections also provide a richer media experience on the computing device as the user may consider these music selections more relevant to the user generally and also to the visual media in particular. These implementations give the user a more meaningful, enjoyable, and emotionally satisfying experience of viewing those visual media. The personalized music selections may also enhance the experience by augmenting or refreshing the user's personal memories of the event or time period when the visual media were created. Particular implementations are also beneficial because they avoid generic or irrelevant music selections. The user is less likely to hear unfamiliar or disliked music in conjunction with the user's visual media. These implementations prevent jarring or unpleasant music selections, thereby saving the user time spent selecting more relevant music. Automatically providing personalized music selections also improves device usage. The user spends less time and resources removing irrelevant music, adding relevant music, or downloading additional software that the user could use to get a more personalized experience.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
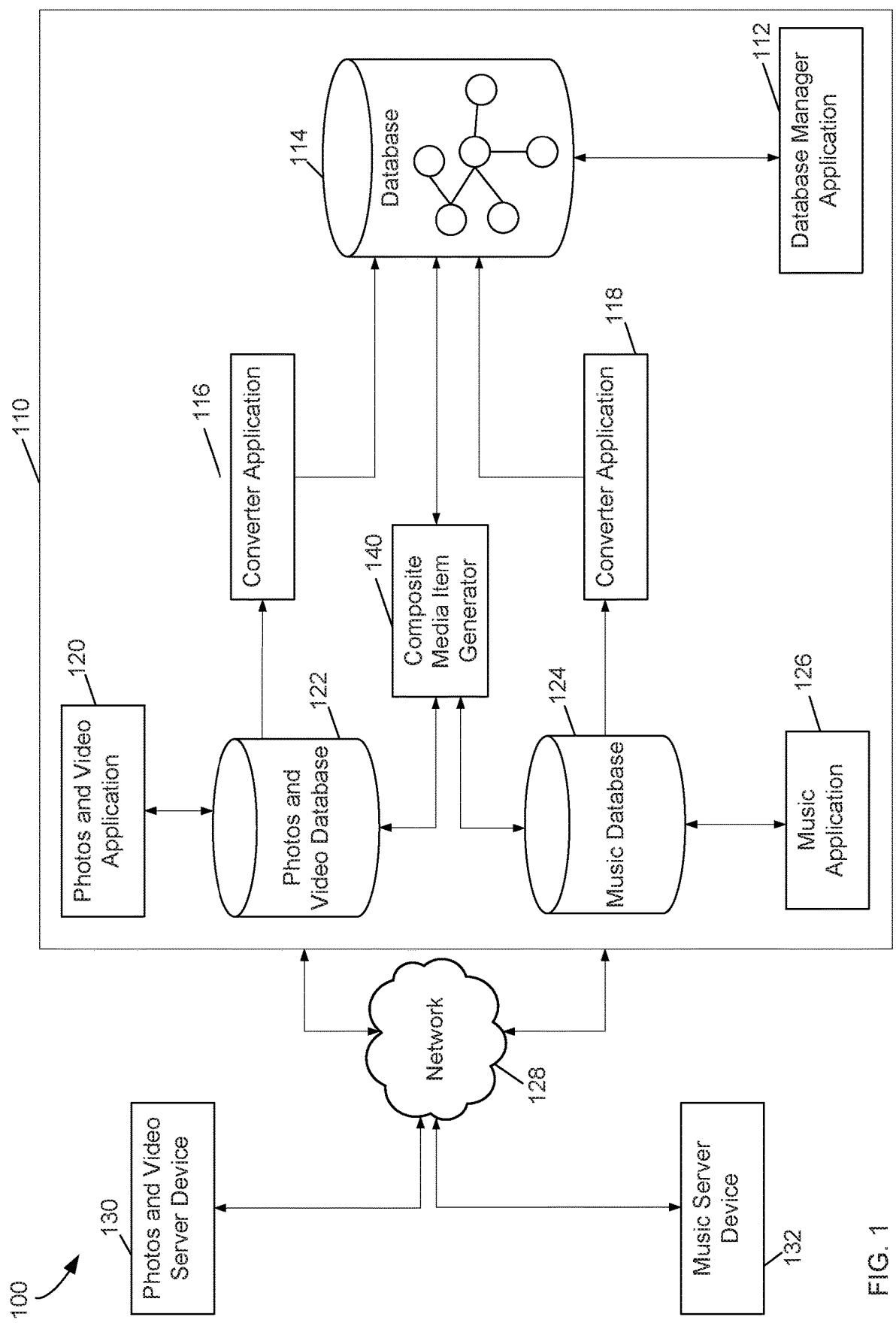
FIG. 1 is a block diagram of an example system for personalized music selections.

FIG. 1 is a block diagram of an example system 100 for personalized music selections. For example, system 100 may be used to generate personalized music selections to associate with visual media (e.g., photos and videos) that a user may create. In some embodiments, a user may use computing device 110 for various functions. These functions may include creating visual media. For example, the user may take photos or create videos using computing device 110. These functions may also include playing audio, such as songs or other music items. System 100 can be used to associate the visual media with selected music items that are more personalized, relevant, or meaningful to the user or to the created images or video. System 100 may be used to generate a composite media item that include a collection of visual media and the personalized music selections. When activated, the composite media item may display the visual media and also play the personalized music selection.

FIG. 1 shows computing device 110. Computing device 110 can be a laptop computer, desktop computer, smartphone, tablet computer, smartwatch device, head-mounted display, other wearable device, or any other computing device. Computing device 110 may be configured to generate personalized music selections for a collection of visual media items stored on computing device 110. For example, a user of computing device 110 may create one or more photos using computing device 110. Also, the user may listen to various music items on computing device 110. Computing device 110 may be configured to associate the music items that are relevant or personal to the user to the created photos in a composite media item.

In some embodiments, computing device 110 includes application 120. Application 120 may be a visual media management application. A user may use application 120 to view photos or videos. The user may also use application 120 to organize these visual media according to different criteria, such as date. The user may also use application 120 to edit visual media (e.g., to crop the media, add effects, add captions).

In some implementations, a visual media item represents a pictorial representation of a moment in time. A user may capture multiple visual media items over time. A collection of visual media items may be photos taken during a day, photos taken within a few hours, photos taken within a few minutes, or the like. In some embodiments, application 120 may be configured to organize the captured photos (or videos) into sets or collections. For example, the photos may be taken at various times during the day. The photos may be taken in quick succession at a certain location, at the same location at different times or within a short period of time at different locations. In some embodiments, application 120 may be configured to create a photo collection for photos taken within a certain time frame. For example, the user may take photos throughout a certain day (e.g., Saturday). Application 120 may be configured to generate a photo collection for all photos taken on Saturday. Application 120 may add additional metadata to the collection. For example, application 120 may add a title "Saturday" to the collection. Application 120 may be configured to store the photo collection in database 122.

As another example, application 120 may determine that a certain set of photos was taken at a certain location over time. For example, the user of computing device 110 may exercise at a gym (e.g., "Gold's Gym") and take photos that day during the user's workout. Application 120 may be configured to determine that location data for each photo in the set of photos corresponds to one or more locations within the gym. For example, each photo may be stored as a digital image file associated with geographic coordinates of the location the photo was taken. Application 120 may be configured to identify the geographic coordinates associated with each photo. Application 120 may be configured to compare the geographic coordinates for one photo with those for another photo and determine a match. Given a match, application 120 may determine that the photos were taken within the geographic boundaries of the gym. Application 120 may add the two photos into a collection representing the gym workout. Application 120 may add additional metadata to the collection. For example, application 120 may add a title "Working out at Gold's Gym" to the collection. In some embodiments, application 120 may be configured to store the photo collection along with the title in database 122.

In some embodiments, application 120 may store user-created data in encrypted form to enhance user privacy. For example, any user-created visual media item is available to view in unencrypted form only on computing device 110. Any communication involving the visual media item is end-to-end encrypted. For example, the contents of database 122 may be viewable only at computing device 110. Any contents of database 122 that are transmitted to another device may not be readable unless they are first decrypted.

In some embodiments, the photos may depict various people. For example, the user may have visited a friend named Joseph on the Saturday identified above. Application 120 may be configured to identify the person in one or more ways. For example, a photo may be captioned "Hanging Out with Joseph". Application 120 may be configured to parse the caption data associated with the photo and determine that the person in the photo is named Joseph. The user may take several photos over time in which Joseph appears. Application 120 may be configured to use, for example, facial recognition techniques to determine each photo in which Joseph appears. Accordingly, application 120 may be configured to identify all such photos as including Joseph. In some embodiments, application 120 may be configured to store such photos in database 122 with additional metadata. For example, the additional metadata may be person identifiers or contact identifiers related to Joseph.

In some embodiments, the photos may depict a certain type of activity, event, or experience. In some embodiments, the concept of "meaning" is used herein to describe ways in which different photos depict a similar experience or symbolize certain experiences or emotions. Meaning may be used to collect photos that do not necessarily have a common person, time, or location.

Application 120 may be configured to collect photos depicting a particular meaning into a single collection. In some embodiments, application 120 may be configured to use image recognition techniques to analyze multiple photos and identify particular objects or image features. For example, certain photos may depict the user in conjunction with mountainous terrain of certain colors and shapes. These photos may depict the user going hiking at various locations at various times. Application 120 may be configured to identify that these photos all depict the user and also that they depict the user outdoors in mountainous areas. Additionally, and as described above, one or more photos may be captioned with "Hiking Trip". Accordingly, application 120 may be configured to analyze the caption for one photo, find other photos depicting a similar environment, and collect all such photos into a collection and title it "Hiking Through The Years".

In some embodiments, the visual media items may depict physical elements of an environment or scenario that may be referred to herein as a "scene". Application 120 may be configured to identify the scene as represented by a certain environment or backdrop in a set of photos. For example, the user of computing device 110 may have visited the beach. The beach photos may depict the sea, sand, beach umbrellas, sunglasses, or other items commonly seen at a beach. Similarly, there may be video of the user at the beach that includes the user swimming in the sea. Application 120 may be configured to identify a particular scene using one or more of the above elements. Application 120 may be configured to determine what objects appear in a photo using image recognition techniques such as comparing portions of an image to a template image (e.g., the appearance of a seashore or shape of sunglasses). Based on the image analysis, application 120 may be configured to identify that certain objects (e.g., a body of water, people swimming, sand) when appearing together in a photo, likely represent a beach scene.

Similarly, the photos may represent some combination of the above elements. In some embodiments, application 120 may be configured to identify that certain people appeared in a certain scene. For example, application 120 may be configured to identify that certain photos depict the person named Joseph at the beach. Accordingly, application 120 may generate a collection that includes all of those photos and title it "At the beach with Joseph".

In some embodiments, the emotional state or feelings represented by the visual media item is referred to herein as a "mood". In some embodiments, application 120 may be configured to identify the mood associated with a visual media item. Application 120 may be configured to analyze the photo using image analysis and/or facial recognition techniques. For example, application 120 may identify that the photo includes a group of people that are smiling or laughing. Application 120 may be configured to determine that the photo represents a happy or uplifting mood. Alternatively, the photo may depict just the user in a serene backdrop or looking away from the camera into the distance. Application 120 may identify a sentimental or gentle mood represented in such a photo. Similarly, and as described above, a photo may be captioned with text such as "Epic workout today! No pain no gain!" Application 120 may be configured to identify an epic or extreme mood represented in the photo. In some embodiments, application 120 may generate one or more mood identifiers and associate these identifiers with the photo in database 122.

In some embodiments, computing device 110 obtains visual media items through network 128 from a remote device, such as photos and video server device 130. For example, photos and video server device 130 may be a server device or storage device. The user may periodically transfer visual media items to and from photos and video server device 130. As noted above, the communication that involves these visual media items may be end-to-end encrypted to enhance user privacy. Photos and video server device 130 may provide additional storage that may be needed because the user has a large number of photos.

In some embodiments, application 120 may be configured to retrieve the visual media items from photos and video server device 130 to generate collections as described above. In other embodiments, visual media items may be sent from photos and video device 130 and automatically stored in database 122 until the user uses application 120 or some other application to view them.

In some embodiments, computing device 110 includes database 122. Database 122 may be configured to store visual media, such as image files, video files, audiovisual data files, associated metadata (e.g., time and location data), or the like. For example, the photos or collections of photos that application 120 created as described above may be stored in database 122. Moreover, database 122 may store additional metadata that may not have been generated at the time the media were created but were generated later by application 120. Examples of this additional metadata include identifiers for mood, scene, or persons as described above with respect to application 120.

In some embodiments, database 122 may be configured to store data in various different data structures. Data in one part of one data structure may be associated with data in another part of the same data structure. Data in one data structure may be associated with data in another data structure. Accordingly, database 122 may store data about photos or videos generated by application 120. Each data structure may represent photos or videos and one or more parameters for the photo or video. For example, database 122 may include parameter values for image size, image capture time, image capture data, image location data, user identifiers, or the like. Database 122 may include additional parameter values for a photo's mood, scene, people appearing in the photo. Also, database 122 may include a parameter value for each photo that includes a visual media collection identifier for the photo. For example, for a photo that was in the visual media collection titled "Joseph's Birthday Party!", database 122 may include a parameter whose value is that title for the photo.

In some embodiments, computing device 110 includes application 126. A user may use application 126 to play many different types of music items. Types of music items include musical pieces, songs, or any other kind of audio item, such as a speech, a podcast, a sound effect, a soundtrack, or the like. For example, a user may listen to one or more songs on a music album by a particular artist.

In some embodiments, a music item may be a digital audio file that includes audio data and one or more identifiers or other metadata. For example, the music item may include metadata describing the music item title, the performing artist, the length of time the music item plays, the associated album identifier, year of performance or recording, music item source (e.g., local storage or a remote music source such as an online music service), ratings for the music item, and the genre associated with the music item.

In some embodiments, a collection of music items may be referred to herein as a "music session". A music session may represent part of a user's historical patterns of music listening. A music session may include a certain number of music items that the user played in close succession. The music items may have been played with time gaps between them that fall below a threshold amount. For example, the user may play a set of music items with less than a minute's gap between the end of one music item and the beginning of another music item. The user may, for example, be listening to a particular album and may play one music item immediately after a prior music item in the album. Or the music items may be configured to automatically play in sequence, such as in a playlist. Where the time gap between plays falls below a threshold, application 126 may determine that the set of music items was played as a single music session.

In another embodiment, application 126 may be configured to treat all music items played within a certain period time as being of a single music session. Application 126 may determine a start timestamp for each play of a music item, relative to the current time. Application 126 may group together music items that have a start timestamp corresponding to a certain time range, such as one hour. Application 126 may be configured to generate a music session for all music items played within that timeframe. Application 126 may add additional metadata to the music session. For example, application 126 may add an identifier titled "Music Session 1; 7:00 AM-8:00 AM" to the music session. Application 126 may be configured to store the music session in database 124.

As noted above, computing device 110 may store user-created data in encrypted form to enhance user privacy. For example, any music item may be accessible in unencrypted form only on computing device 110. Any communication involving the music item is end-to-end encrypted. For example, the contents of database 124 may be viewable only at computing device 110. Any contents of database 124 that are transmitted to another device may not be readable unless they are first decrypted.

Similarly, application 126 may generate a music session based on the user's location. For example, the user may listen to a number of music items while working out at a gym. Application 126 may determine that the music items were all played within substantially the same location. For example, application 126 may determine the user's location each time a music item is played. Each time a next music item is played, application 126 may determine whether the user's location changed by more than a threshold amount. If application 126 determines that the user's location remained largely static from play of one music item to another, application 126 may determine that both music items correspond to one location. Accordingly, application 126 may generate a music session that includes the two music items and any other music items that were played as long as the user was at that particular location.

Application 126 may be configured to identify a particular genre for a music item. In some embodiments, application 126 may identify that the metadata for the music item includes a genre identifier. For example, the user may be listening to an album recorded by a rock band. The digital audio file for each song in the album may have an associated genre identifier such as "Rock" or "Rock Music". In other embodiments, the music item may not have a stored genre identifier. Application 126 may be configured to identify the genre using audio processing techniques. For example, application 126 may have one or more stored genre templates. Each genre template may represent common elements of a music genre. Each genre template may be a template audio file composed of these common elements. Each genre template may also be one or more actual songs that typify a certain genre. For example, a disco music track may be perceived to include a certain beat, certain instruments, or other audio characteristics such as a particular vocal range, pitch, or particular sound effects. Application 126 may be configured to compare each music item that is played with the one or more stored genre templates. Based on the comparison, application 126 may determine a match between the music item that is playing and one of the genre templates. Accordingly, application 126 may determine a genre identifier for the genre. In some embodiments, application 126 may store the determined genre identifier in conjunction with the music item in database 126. In still other embodiments, the user may provide genre information. For example, the user may edit metadata for a music item and include the user's own genre identifier(s). Accordingly, application 126 may be configured to store the provided genre identifier in association with the music item in database 124.

In some embodiments, application 126 may be configured to identify the mood associated with a particular music item. As described above, a mood may represent the emotional state or feelings that can be associated with a media item, such as a music item. Application 126 may be configured to analyze the music item using audio processing techniques. In some embodiments, application 126 may identify audio characteristics of the music item. For example, application 126 may analyze the beat, chord progression, sequences of notes, overall pitch, bass, treble, or other audio characteristics for the music item. Application 126 may be configured to store one or more mood templates. For example, a mood template representing an epic or extreme mood may specify a very fast beat, a high overall volume level, and a very high vocal or instrumental pitch. Application 126 may be configured to compare each music item that is played with the one or more stored mood templates. Based on the comparison, application 126 may determine a match between the music item that is playing and one of the mood templates. In some embodiments, application 126 may store an identifier for the determined mood in conjunction with the music item in database 126.

Application 126 may be configured to analyze other metadata associated with the music item to determine the mood. In some embodiments, application 126 may analyze the title or lyrics for a music item. Application 126 may be configured to apply textual analysis techniques to the title and/or lyrics for the music item. Application 126 may store one or more keyword files that each include words or phrases associated with a particular mood. For example, a keyword file representing a "happy" mood may include text such as "happy", "I'm happy", "happiness" or the like. Application 126 may be configured to compare the title or lyrics to each keyword file. Application file may determine the keyword file that is the best match. For example, one keyword file may match with more words in the lyrics than any other keyword file. For example, a music item may be titled "Happy" with lyrics that frequently include words like "I'm happy", "clap", "happiness is the truth", or the like. Application 126 may be configured to determine that the mood for that music item is "Happy" or "Uplifting" based on the textual analysis of the music item's title and lyrics.

In some embodiments, computing device 110 obtains music items through network 128 from a remote device, such as music server device 132. For example, music server device 132 may be a server device or storage device. The user may periodically transfer music items to and from music server device 132. As noted above, the communication that involves these music items may be end-to-end encrypted to enhance user privacy. Music server device 132 may provide additional storage that may be needed because the user has a large number of music items.

In some embodiments, application 126 may be configured to retrieve the music items from music server device 132 to generate collections as described above. In other embodiments, music items may be sent from music server device 132 and automatically stored in database 124 until the user uses application 126 or some other application to play them.

In some embodiments, computing device 110 includes database 124. Database 124 may be configured to store music item data, such as audio files and associated metadata (e.g., album identifiers, performer identifiers, track identifiers, duration, etc.). Database 124 may also be configured to store time-based data for when a music item was played, what portion of the music item was played (e.g., start and end timestamps relative to the total duration), frequency of plays, or the like. Database 124 may also be configured to store location data for where the music item was played.

In some embodiments, database 124 may represent a history of the user's listening experiences, such as music items that the user has played on computing device 110 using music application 126. Database 124 may also include music items that are only stored on database 124 but have not been played. Database 124 may also include identifiers for music items that are accessible from music server device 132 and have been played at computing device 110 through a networked connection. Database 124 may also represent music items that are accessible from music server device 132 and have not been played at computing device 110.

Relatedly, database 124 may also include identifiers for music items that are stored on music server 132 as a curated list of music items. The list of music items may be carefully selected by human reviewers. For example, the reviewers may create various music item lists that each correspond to one or more moods. As another example, music server 132 may electronically create curated music item lists. Music server 132 may be configured to use audio analysis algorithms to determine whether a candidate music item matches a mood as described above with respect to FIG. 1. Music server 132 may assign a mood to each music item in the curated music item list. Database 124 may be used to access items on these curated music item lists.

In addition, database 124 may store additional metadata that may not have been generated at the time the music items were created but were generated later by application 126. Examples of this additional metadata include identifiers for mood or genre as described above with respect to application 126.

In some embodiments, database 124 may be configured to store data in various different data structures, similarly to database 122. Accordingly, database 124 may store data about music items played by application 126. Each data structure may represent a music item with values for one or more parameters for the music item. For example, database 124 may include parameter values for artist, album, duration, genre, mood, or the like. Also, database 124 may include a parameter value for each photo that includes a music session identifier for the photo. For example, for a photo that was in the music session titled "Music Session 1; 7:00 AM-8:00 AM", database 124 may include a parameter whose value is that music session title for the music item.

In some embodiments, database 114 may be configured to store data as a network or web of interrelated data structures. Each data structure may be referred to herein as a node. Nodes may store various forms of data. For example, a node may represent an individual visual media item or a visual media item collection. A node may represent a music item or a music item session as well.

A node may represent metadata for the visual media item. Visual media item metadata may include values such as the date or time the visual media item was created or the location where the visual media item was created. Visual media metadata may include image size, image capture time, image capture data, image location data, user identifiers, or the like.

A node may represent an attribute of a visual media item. As used herein, an attribute of a visual media item may refer to some identifiable component of the visual media item that is identified by analyzing the visual media item itself. An attribute may be distinct from visual media item metadata since the metadata may be electronically generated as part of the creation of the visual media item. Attributes of the visual media item may include persons or scenes appearing in the visual media item. Attributes of the visual media item may include representations of meanings or experiences depicted by the visual media item. Attributes of the visual media item may include a mood (e.g., happy, chill, excited) represented in the visual media items.

These node data structures may be connected to other node data structures via relationship data structures that indicates how one node relates to another node. Each relationship data structure may be referred to herein as an edge. Database 114 may store various nodes and edges for data received from database 122 and database 124 and enable traversal across edges from one node to another node. For example, an edge may represent a relationship between a visual media collection node and a date node.

In some embodiments, computing device 110 includes converter application 116. Converter application 116 may be configured to convert data from database 122 into a format compatible with database 114. As described above, database 122 may store data in various data structures. Converter application 116 may be configured to convert the data structures of database 122 into data structures that are compatible with database 114. In some embodiments, converter application 116 may convert data from database 122 into a format compatible with database 114 and store the result in database 114.

In some embodiments, database 114 may be stored locally on computing device 110. Database 114 may store data received from databases 122 and 124 and may store relationships between data received from those databases. In some embodiments, the contents of database 114 are encrypted by default. The contents of database 114 may be accessible in unencrypted form only by other modules of computing device 110 (e.g., composite media item generator 140). Any communication involving data stored in database 114 is end-to-end encrypted, thereby enhancing user privacy.

In some embodiments, converter application 116 may retrieve visual media item data from database 122 periodically. For example, at a certain time of day each day, converter application 116 may retrieve visual media item data from database 122. In some embodiments, converter application 116 may be configured to retrieve new visual media items only. In some embodiments, converter application 116 may retrieve new items and determine other changes (e.g., photo deletions, edits to photos, etc.). Converter application 116 may then analyze the visual media item data to determine the nodes and edges to be created. For new visual media item data, converter application 116 may then generate the required nodes and edges within database 114. If certain visual media items were recently deleted, converter application 116 may be configured to remove one or more nodes or edges from database 114.

For example, as described above, a photo stored in database 122 may have associated metadata including time of capture and location of capture. Database 122 may store the photo data in, for example, a table with a row representing the photo and columns for each of time and location of capture. Converter application 116 may be configured to retrieve the row representing the photo and generate a node for the photo. In some embodiments, converter application 116 may not store the actual digital image files for each photo in database 114. Rather, converter application 116 may store identifiers or other metadata for the photos within the node data structure. The identifiers may be used to retrieve the actual digital image file if necessary.

Similarly, converter application 116 may be configured to generate nodes for collections of photos. For example, as described above, a visual media collection may represent photos the user took during a workout at the gym. Converter application 116 may be configured to retrieve all photos identified as being part of that time and/or location and generate a node for all of those photos. Converter application 116 may store the node in database 114.

Converter application 116 may also generate a node representing the time of capture for the photos in a visual media collection. It is likely that multiple photos were taken within a few seconds or minutes of each other. Accordingly, converter application 116 may be configured to generate a time node that represents a time range (e.g., 1 hour). For example, for a photo taken at 4:05:32 PM and another photo taken at 4:06:03 PM, a time of capture node titled "4:00 PM-5:00 PM" may be created to represent both photos in the visual media collection.

Converter application 116 may also be configured to generate a location node for the visual media collection. Items in visual media collection may be represented as rows in database 122, with a location column for each row denoting the item creation location. Accordingly, converter application 116 may convert location data from the location column in database 122 into a location node to be stored in database 114. In some embodiments, the location node may represent a range of contiguous points rather than the specific pinpoint location at which each photo in the visual media collection was taken. For example, a photo's location may be stored as a set of geographic coordinates in database 122. However, converter application 116 may be configured to generate a location node representing a range of geographic coordinates that includes the photo's actual location of capture. The intent is to generate a node that can encompass multiple photos for the collection that were taken in substantially the same location. For example, the user may take one photo at one corner of a large gym and, later, another photo at another corner of the gym. Location data for both photos may be represented by different geographic coordinates. However, converter application 116 may be configured to generate a location node that represents a range of geographic coordinates. The range of geographic coordinates may be calculated to include the geographic coordinates for both photos of that period that were taken inside the gym.

Converter application 116 may be configured to also generate edges between the nodes. For example, converter application 116 may identify a relationship between the visual media collection node and the time node. The two nodes and the edge may be stored as Node: "Gym workout"|Edge: "Taken On"|Node: "4:00-5:00 PM, May 16, 2019". Edges may be unidirectional or bidirectional. For example, the abovementioned relationship may represent a traversal from the visual media collection node to the time node. The reverse traversal may be represented as Node: "4:00-5:00 PM, May 16, 2019"|Edge: "Time of Capture for"|Node: "Gym workout".

In some embodiments, computing device 110 includes converter application 118. Converter application 118 may be configured to convert data from database 124 into a format compatible with database 114. As described above, database 124 may store data in various data structures. Converter application 118 may be configured to convert the data structures of database 124 into data structures that are compatible with database 114. In some embodiments, converter application 118 may convert data from database 124 into a format compatible with database 114 and store the result in database 114.

In some embodiments, converter application 118 may retrieve music item data from database 124 periodically. For example, at a certain time of day each day, converter application 118 may retrieve music item data from database 124. In some embodiments, converter application 118 may be configured to retrieve new visual media items only. In some embodiments, converter application 116 may retrieve new items and determine other changes (e.g., photo deletions, edits to photos, etc.). Converter application 116 may then analyze the visual media item data to determine the nodes and edges to be created. For new visual media item data, converter application 116 may then generate the required nodes and edges within database 114. If certain visual media items were recently deleted, converter application 116 may be configured to remove one or more nodes or edges from database 114.

For example, as described above, a music item stored in database 124 may have associated metadata including time of play and location of play. Database 124 may store the music item data in, for example, a table with a row representing the music item and columns for each of time and location of play. Converter application 118 may be configured to retrieve the row representing the music item and generate a node for the music item. In some embodiments, converter application 118 may not store the actual digital audio files for each music item in database 114. Rather, converter application 118 may store identifiers or other metadata for the music items within the node data structure. The identifiers may be used to retrieve the actual digital audio file if necessary.

Similarly, converter application 118 may be configured to generate nodes for music sessions or collections of music items. For example, as described above, a music session may represent music items the user played during a commute to work. Converter application 118 may be configured to retrieve all music items identified as being part of that music session and generate a node for all of those music items. Converter application 118 may store the node in database 114.

Converter application 118 may also generate a node representing the time of play for the music items in the music session. Multiple music items may represent the same music session but were played within a certain time range. Accordingly, converter application 118 may be configured to generate a time node that represents a time range (e.g., 1 hour). For example, for a music item that began play at 7:12:05 AM, and another music item that began play at 7:17:58 AM, a time of play node titled "7:00 AM-8:00 AM" may be created to represent both music items in the music session.

Converter application 118 may also be configured to generate a location node for the music session. Accordingly, converter application 118 may convert location data from a location column in database 124 into a location node to be stored in database 114. In some embodiments, the location node may represent a range of points rather than the specific pinpoint location that each music item in the music session was played. For example, a music item's location of play may be stored as a set of geographic coordinates in database 124. However, converter application 118 may be configured to generate a location node representing a range of geographic coordinates that can encompass the locations of play for all music items in a music session.

For example, while driving a car, the user may enjoy a music session with multiple music items. The user may play one music item at one location on a road and, later, another music item at another location a few miles down the road. Location data for both music items may be represented by different geographic coordinates. However, converter application 118 may determine that while the locations for both music items differ considerably, both music items are identified as being of a single music session (e.g., by application 126). Accordingly, converter application 118 may be configured to generate a location node that represents the locations of play for all items in the music session. For example, converter application 118 may analyze the geographic coordinates associated with each music item in the music session and determine greatest and least values for the geographic coordinates. Converter application 118 may generate a location node for a location range represented by the determined greatest and least values.

Converter application 118 may be configured to also generate edges between the nodes. For example, converter application 118 may identify a relationship between the music session node and the location node. The two nodes and the edge may be stored as Node: "Music Session 1"|Edge: "Played at"|Node: "40-50° N, 0-10° E". Edges may be unidirectional or bidirectional. For example, the abovementioned edge may represent a traversal from the music session node to the time node. The reverse traversal may be represented as Node: "40-50° N, 0-10° E"|Edge: "Location of play for"|Node: "Music Session 1".

In some embodiments, database 114 is configured to store interrelationships between visual media item data (e.g., as received from database 122) and audio data (e.g., as received from database 124). For example, a visual media item node and a music item node or music session node may be connected to a certain date node. A user can use database 114 to traverse from the visual media item node to the music session node through the date node. The user may determine, for example, that the visual media item was created on the same date as the music session was played.

In some embodiments, computing device 110 includes database manager application 112. Database manager application 112 may be configured to analyze the nodes and edges created in database 114. For example, database manager application 112 may determine all the music items that correspond to a certain genre. More specifically, database manager application 112 may be configured to identify all the music item nodes that have an edge into a particular genre node. Database manager application 112 may also be configured to determine particular genres that are associated with a person. For example, database manager application 112 may identify the edges that connect to the person's node and a visual media collection node. Database manager application 112 may then traverse database 114 to identify any music sessions associated with that visual media collection node, and genres associated with each music item in each identified music session. Database manager application 112 may then be configured to identify that a person appears in certain visual media items that were created concurrently with play of certain music items. Database manager application 112 may determine that the user of computing device 110 tends to associate that person with the identified genres.

In some embodiments, database manager application 112 creates genre distributions based on the identified genres. A genre distribution may be a statistical data representation (e.g., a frequency distribution or set of percentage values) or some other indicator (e.g., a heat map) that represent a user's music genre preferences. Genres the user prefers may appear as more dominant in the genre distribution, and vice versa. For example, the genre distribution may be a percentage distribution where the set of all outcomes add up to 100%. The user may listen to two genres (e.g., jazz and classical) roughly equally over time. Accordingly, the user's genre distribution may indicate the two genres as being represented 50% of the time based on the user's historical listening patterns.

Database manager application 112 may also be configured to generate genre distributions based on certain attributes of the visual media items. In some embodiments, the visual media collection may depict persons, moods, scenes, or different meanings. Database manager application 112 may be configured to associate these attributes, whether alone or in combination, with a genre distribution.

For example, a particular person, such as a friend of the user, may have an associated genre distribution composed of genres that the user prefers when in the company of that friend. For example, the user may take photos with the friend and at a similar time or location, play certain music items as well. Application 120 may later identify the friend from the photos. Database manager application 112 may be configured to identify the music played at the same time or location as the friend's photos were taken. Database manager application 112 may create an association between the friend and the music. For example, in database 114, a person node may be connected to a visual media item node. The visual media item node may be connected to a certain date/time node and/or a location node. These date/time and location nodes may also be connected to a music session. The music session may include a number of music items, each with its own genre designation. The genre designations may have their own node in database 114. Accordingly, database manager application 112 may be configured to traverse from the person node to the genre nodes. Database manager application 112 may count the edges leading from the music items to the genre nodes to create a genre distribution that is specific to that friend.

Similarly, a genre distribution may be created based on visual media items the user creates in certain environments or scenes, such as at the beach. The user may have taken photos at the beach and listened to some music items at a similar time and/or location. Database manager application 112 may be configured to use this commonality in time and location to generate new relationships between the scene node and genre nodes. Again, the scene node may connect to the visual media collection node for visual media items taken at that scene. The visual media collection node may connect to a date/time node or location node. These date/time or location nodes may in turn be connected to a music session node representing the music items the user played at the beach. Each music item node may connect to a genre node. As a result, database manager application 112 can generate a genre distribution that is directly associated with a particular scene, such as a beach.

Database manager application 112 may be configured to manage database 114. Database manager application 112 may be configured to orchestrate the use of converter application 116 and converter application 118. For example, database manager application 112 may direct converter application 116 and converter application 118 to periodically retrieve visual media item data from database 122 or music item data from database 126. Database manager application 112 may be configured to review or inventory the contents of database 114 and use the review results to improve the functionality of converter application 116 and converter application 118. For example, database manager application 112 may traverse all nodes and edges of database 114 and generate a node inventory. The node inventory may include, for example, location of capture nodes corresponding to collections of visual media items (e.g., where the photos were taken). Database manager application 112 may be configured to provide the node inventory to converter application 116 and converter application 118. Database manager application 112 may direct converter applications 116 and 118 to generate edges for new visual media items to existing nodes where the metadata for the new visual media items corresponds to the existing nodes.

As an example, there may exist a location of capture node corresponding to the user's home. This node may represent the location for photos the user has taken in the past. The user may take additional photos at home over time. Database manager application 112 may be configured to direct converter application 116 and converter application 118 to generate edges to the existing location node that corresponds to the user's home, rather than creating a new location node.

In some embodiments, computing device 110 may include composite media item generator 140. Composite media item generator 140 may be configured to generate a media item that combines one or more visual media items and one or more music items into a composite media item. For example, composite media item generator 140 may generate an audiovisual presentation in the form of a slideshow of the visual media items that displays while the one or more music items are played. Application 120 or composite media item generator 140 may be configured to provide an interactive control (e.g., a play button) for the user to activate the composite media item. In some embodiments, the composite media item may represent a memory of the user's experiences at the time the visual media items were captured.

As described above, database manager application 112 may be configured to create genre distributions that relate to particular attributes of visual media items, based on historical music listening patterns of the user. Composite media item generator 140 may be configured to use these relationships between visual media attributes and genre to select a music item for a new collection of visual media items. For example, composite media item generator 140 may receive a collection of visual media items. These items may have been recently created. Composite media item generator 140 may be configured to select a music item using the genre distribution created by database manager application 112. More particularly, composite media item generator 140 may determine the particular combination of visual media attributes depicted in the visual media items. For example, composite media item generator 140 may retrieve, for the visual media items, associated mood, scene, person, and meaning nodes from database 114. There may be a genre distribution associated with some or all of these visual media attribute nodes. Database manager application 112 may create a composite genre distribution composed of each genre distribution that is associated with each visual media attribute. Composite media item generator 140 may be configured to select a music item based on the composite genre distribution.

In some embodiments, composite media item generator 140 selects a music item from database 124. As described above, database 124 may include music that may or may not have been played by the user. Database 124 may represent music that may or may not be stored on computing device 110 but be accessible through identifiers stored on database 124. Accordingly, composite media item generator 140 may use the genre distributions generated from music sessions of the user to select a music item that may not appear in those music sessions. The genre distributions serve to identify the right genre or genres that would be relevant to attributes of the visual media items (e.g., scene, mood, person, meaning, etc.). Once composite media item generator 140 determines the genre distribution associated with the visual media item attributes, composite media item generator 140 can select any music item that fits the genre distribution, whether the music item has been stored or played or not.

In some embodiments, composite media item generator 140 may be configured to generate a composite media item at the time a user views a collection of media items. For example, a user may retrieve a photo collection using application 120. Composite media item generator 140 may be configured to detect the retrieval action and automatically generate a composite media item that combines a presentation of the photos in the collection with a selected music item.

In some embodiments, music item data and visual media item data may be created by a user and stored on computing device 110. In some embodiments, the music item data and visual media item data is accessible in unencrypted form only on computing device 110 by the user of computing device 110. If any music or visual media data or associated metadata is communicated to another device, communications corresponding to those data may be encrypted in an end-to-end encrypted manner, thereby protecting user privacy.

Figure 2:
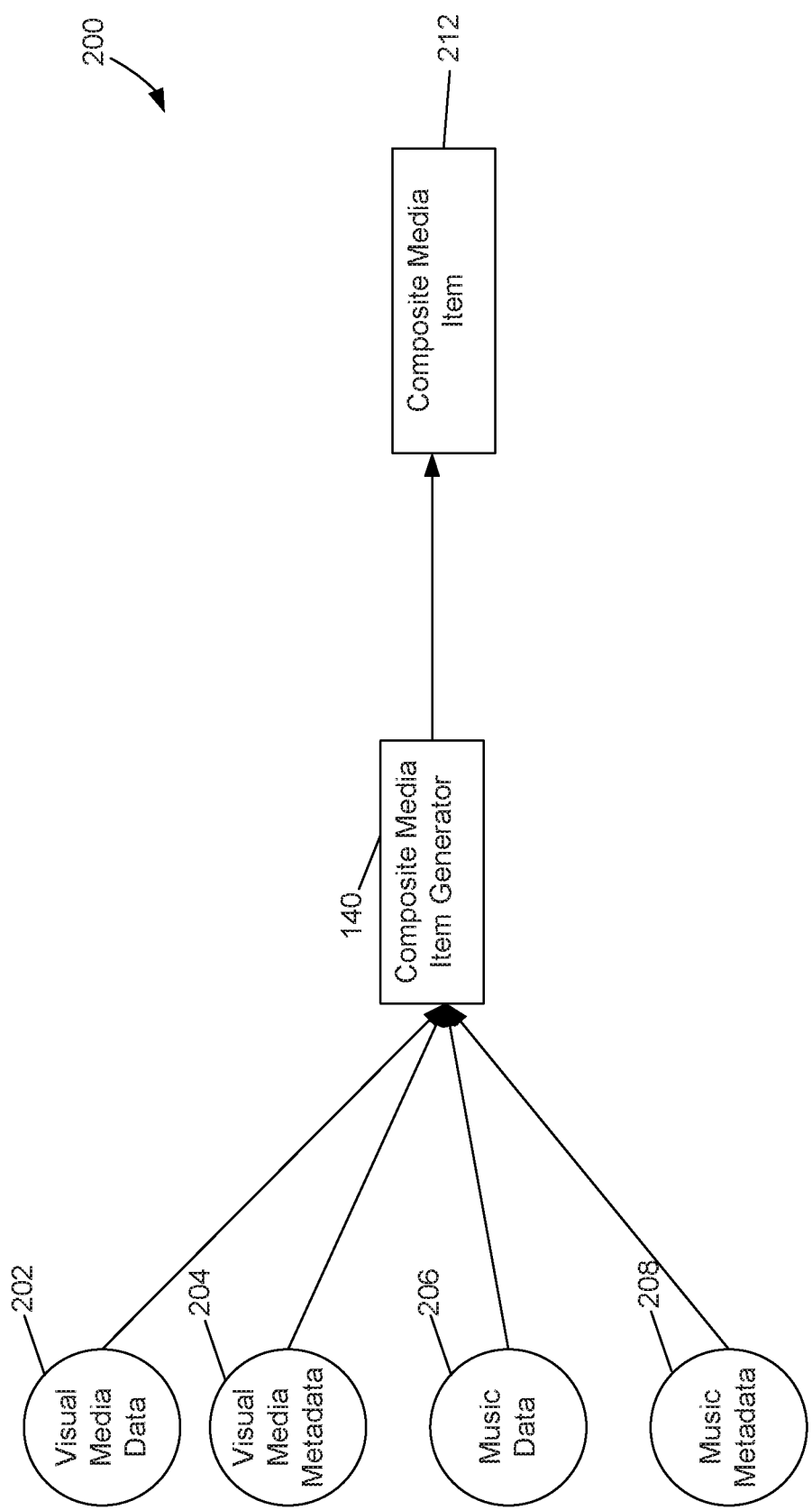
FIG. 2 is a flow diagram showing how a composite media item generator generates composite media items.

FIG. 2 is a flow diagram 200 showing how composite media item generator 140 generates composite media items. FIG. 2 illustrates the data sources that composite media item generator 140 uses to generate, for example, composite media item 212. In some embodiments, these data sources are nodes stored on database 114.

FIG. 2 shows visual media data node 202, visual media metadata node 204, music data node 206, and music metadata node 208. In some embodiments, visual media data node 202 may represent a visual media item or collection of visual media items retrieved from database 122. Visual media data node 202 may be, for example, a collection of photos or videos the user took using application 120. These photos may be stored in database 122 or accessed from, for example, photos and video server device 130.

Visual media metadata node 204 may include metadata for the user's photo collection. For example, visual media metadata node 204 may include image size, image capture time, image capture data, image location data, user identifiers, or the like. Visual media metadata node 204 may also include user-created metadata such as captions. For example, the user may take one or more photos using application 120. Application 120 may be a digital camera application that may be configured to generate visual media metadata node 204 for each created photo. In some embodiments, visual media metadata node 204 may be stored in database 122 or accessed from photos and video server device 130.

Music data node 206 may represent one or more music items. These music items may be stored on database 124 or accessed from, for example, music server device 132. In some embodiments, music data node 206 may include digital audio files that, when activated, cause play of a music item. In other embodiments, music data node 206 may include references or identifiers for music items, rather than the digital audio files for the music item. For example, music data node 206 may include an electronic address for a music item at music server device 132. An application such as composite media item generator 140 may be configured to use the provided address to retrieve or activate the referenced music item. For example, music data node 206 may represent a history of the user's listening experiences, such as music items that the user has played on computing device 110 using music application 126. Music data node 206 may also represent music items that are only stored on database 124 but have not been played. Music data node 206 may also represent music items that are accessible from music server device 132 and have been played at computing device 110 through a networked connection. Music data node 206 may also represent music items that are accessible from music server device 132 and have not been played at computing device 110.

Relatedly, music data node 206 may also represent music items that are stored on music server 132 as a curated list of music items. The list of music items may be carefully selected by human reviewers. For example, the reviewers may create various music item lists that each correspond to one or more moods. As another example, music server 132 may electronically create curated music item lists. Music server 132 may be configured to use audio analysis algorithms to determine whether a candidate music item matches a mood as described above with respect to FIG. 1. Music server 132 may assign a mood to each music item in the curated music item list. Music data node 206 may access items on these curated music item lists.

Music data node 206 may also represent one or music sessions. For example, music data node 206 may include a collection of music items that the user played via music application 126 within a certain time and/or a certain location. As in the example of one music item, music data node 206 may include only references or pointers to the actual digital audio files for each music item in a music session. For example, for a music session, music data node 206 may include only a list of electronic addresses for the music items played during a session. The list of electronic addresses may be memory addresses within, for example, database 124. The list of electronic addresses may be remote addresses to memory locations within music server device 132.

Music metadata node 208 may include metadata for each music item that has been played on computing device 110 or is available for play on computing device 110. Music metadata node 208 may include, for example, album identifiers, performer identifiers, track identifiers, duration, etc.). Music metadata node 208 may also include time-based data for when a music item was played, what portion of the music item was played (e.g., start and end timestamps relative to the total duration), frequency of plays, or the like. Music metadata node 208 may also include location data for where the music item was played. Music metadata node 208 may also include mood identifiers for each music item, indicating the mood that is associated with the music item.

Composite media item generator 140 may retrieve a collection of visual media items from visual media data node 202. Composite media item generator 140 may retrieve the metadata for those visual media items from visual media metadata node 204. Composite media item generator 140 may use visual media data node 202 and visual media metadata node 204 to create a visual presentation of the visual media collection. For example, composite media item generator 140 may generate a slideshow of photos in the visual media collection. Visual media metadata node 204 may indicate the image capture time for each photo in the collection. Composite media item generator 140 may be configured to use the image capture time data to cause the slideshow to display the photos in the order in which they were taken. Composite media item generator 140 may also retrieve the mood identifier associated with the photos in the visual media collection from visual media metadata node 204. As noted above, application 120 may identify a mood for a visual media item or collection.

Composite media item generator 140 may then retrieve data from music data node 206 and music metadata node 208 from database 122. Composite media item generator 140 may be configured to retrieve the mood identifier associated with the music items in music data node 206 from music metadata node 208.

Composite media item generator 140 may combine the visual media collection from visual media data node 202 and one or more music items from music data node 206 to generate a composite media item 212. In some embodiments, composite media item generator 140 may use the mood identifier, such as a "Happy" mood, for the visual media collection to filter music data node 206 to retrieve only music items that are also associated with that mood identifier.

Composite media item generator 140 may then identify a particular genre distribution to use to select a music item. In some embodiments, composite media item generator 140 may select a genre distribution that corresponds to music sessions played during a certain time (e.g., the past 28 days). In other embodiments, composite media item generator 140 may select a genre distribution based on attributes of the visual media collection. For example, visual media data node 202 may be connected to attribute nodes such as people nodes and scene nodes (described later with respect to FIG. 3). Composite media item generator 140 may be configured to select a genre distribution that corresponds to one or more of the attributes of the visual media collection (as described in greater detail with respect to FIGS. 6-10).

Composite media item generator 140 may select, using the genre distribution, a music item from music data node 206. For example, composite media item generator 140 may determine the most frequently appearing genre in the genre distribution, such as pop songs. Composite media item generator 140 may be configured to select a pop music item that matches the mood identifier "Happy" from music data node 206. Composite media item generator 140 may associate the selected pop music item with the visual media collection to generate composite media item 212. When composite media item 212 is activated, the photos from the visual media collection may display on a screen of computing device 110 in conjunction with audio play of the selected pop music item.

Figure 3:
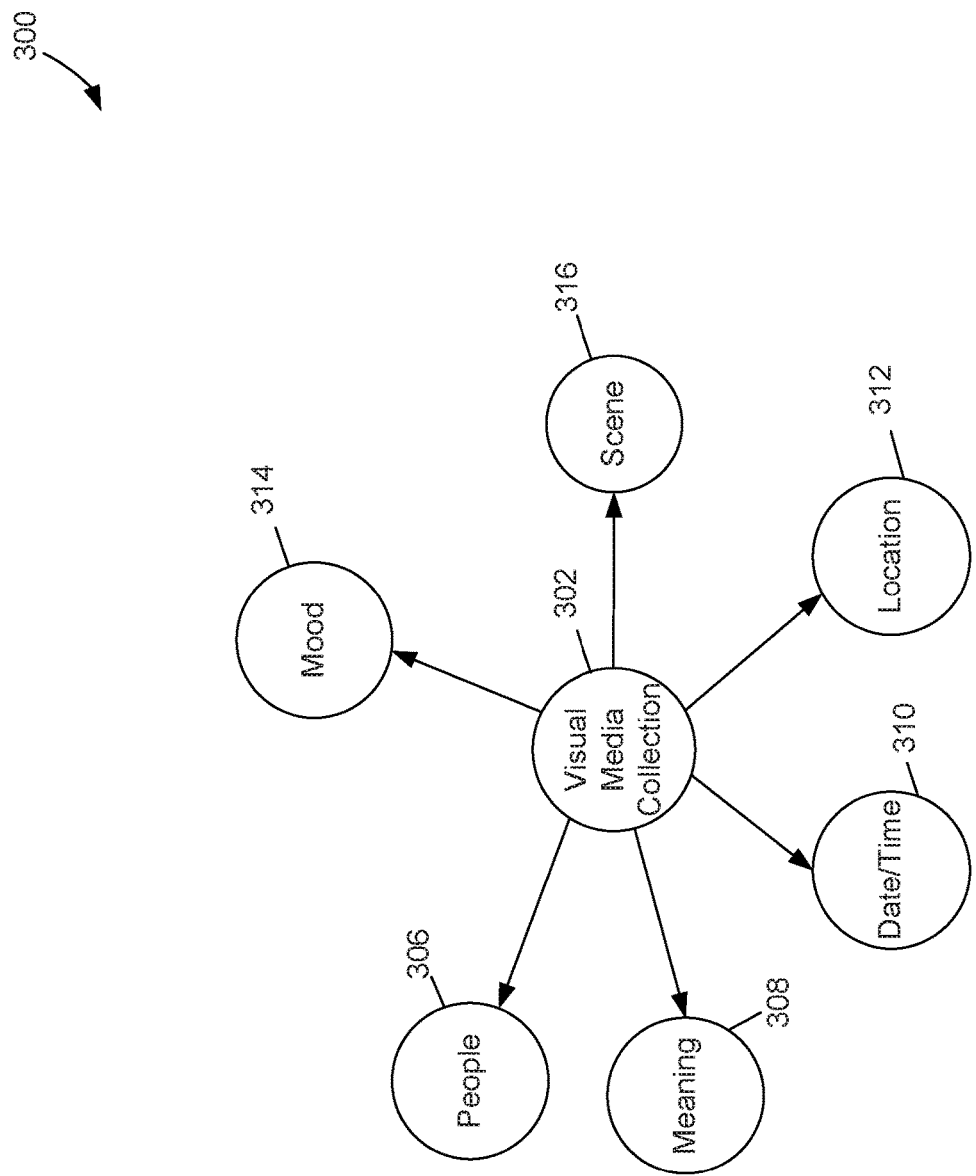
FIG. 3 shows a data representation of a visual media collection node as stored in a database.

FIG. 3 shows a data representation 300 of a visual media collection node 302 as stored in database 114.

In some embodiments, converter application 116 may generate visual media collection node 302 using visual media items received from database 122. As described above, a collection of visual media items may represent a period of time or 'moment' in time for the user. For example, a user may use application 120 to store visual media items in database 122. Application 120 may organize the visual media items into a collection. For example, application 120 may recognize that the visual media items were all created on a single day.

Converter application 116 may receive the collection of visual media items and associated metadata (e.g., visual media metadata node 204, shown in FIG. 2). Converter application 116 may convert the collection of visual media items into a visual media collection node 302 within database 114. Additionally, converter application 116 may generate nodes relating to metadata for the visual media items. For example, application 120 may have recognized the date and location at which the visual media items were created. For example, application 120 may have recognized a particular mood in the visual media items. Application 120 may have recognized certain people, or scenes, or indicators of meaning or experience and stored these as, for example, visual media metadata node 204. Accordingly, converter application 116 may generate several nodes representing visual media metadata node 204. Converter application 116 may generate people node 306, meaning node 308, date/time node 310, location node 312, mood node 314, and scene node 316.

In some embodiments, people node 306 may include data for people that appear in the visual media collection 302. As described above, application 120 may use facial recognition techniques to identify one or more people appearing in visual media items in visual media collection 302. For example, a user may have taken several photos that include a friend named Joseph. Application 120 may store people identifiers such as the name "Joseph" or electronic contact information for the friend in database 122 (e.g., in a column for the row denoting a visual media item or collection). Converter application 116 may be configured to generate people node 306 using the people identifiers. Converter application 116 may also generate an edge connecting people node 306 with visual media collection node 302.

In some embodiments, meaning node 308 may include data for meanings associated with visual media items that are stored as visual media collection 202. As described above, "meaning" may indicate, for example, a particular experience for the user, a certain significance or connotation attached to the visual media items, or what the visual media items symbolize. For example, the user may take several photos on the user's birthday over different years, at different locations, or with different people. The photos may not have time, location, or participants in common. But application 120 may be configured to use image analysis techniques to recognize that the disparate photos symbolize the user's birthday across the years. Accordingly, application 120 may associate a meaning identifier (e.g., "birthday") with the visual media collection in database 120. Converter application 116 may retrieve the meaning identifier and generate meaning node 308. Converter application 116 may also generate an edge from meaning node 308 to visual media collection node 302. The edge may indicate that the meaning represented by meaning node 308 is symbolized in the visual media items of visual media collection node 302.

As noted above, database 122 may store date and time information for when the visual media items in a visual media collection were created. Converter application 116 may be configured to generate date/time node 310 in database 114 to represent the abovementioned date and time information. A visual media collection may include multiple visual media items that were created at different times within a time span. Application 120 may include an associated timestamp at the creation of each visual media item, such as "May 17, 2019, 4:05:32 PM". Accordingly, converter application 116 may be configured to generate a date/time node that represents a time range (e.g., 1 hour) that can include the timestamp associated with each visual media item. For example, one photo may be taken at "May 17, 2019, 4:05:32 PM" and another photo may be taken at "May 17, 2019, 4:06:03 PM". Converter application 116 may create date/time node 310 to represent "May 17, 2019, 4:00 PM-5:00 PM" and thus encompass the creation time for both photos. Converter application 116 may create an edge between date/time node 310 and visual media collection node 302 to express that date/time node 310 represents the time range when all the visual media items in visual media collection node 302 were created.

Converter application 116 may also be configured to generate a location node to associate with visual media collection node 302. Items in visual media collection 302 may be represented as rows in database 122, with a location column for each row denoting the item creation location. Accordingly, converter application 116 may retrieve location data from the location column in database 122 for the visual media items in visual media collection 302. Converter application 116 may transfer the location data into location node 312 to be stored in database 114. In some embodiments, location node 312 may represent a range of contiguous points rather than the specific pinpoint location at which each photo in the visual media collection was taken. For example, application 120 may store a photo's location as a set of geographic coordinates in database 122. Converter application 118 may analyze the geographic coordinates associated with each music item in the music session and determine greatest and least values for the geographic coordinates. Converter application 118 may generate location node 312 for a location range represented by the determined greatest and least values.

Converter application 116 may also be configured to generate mood node 314 using mood identifiers associated with items in visual media collection 302. For example, application 120 may analyze the visual media items and determine the corresponding mood, as described above. Converter application 116 may be configured to retrieve, from database 122, the mood identifier that corresponds to the visual media items. Converter application 116 may generate mood node 314 to represent the retrieved mood identifier.

In some embodiments, converter application 116 may be configured to generate scene node 316. As described above, a collection of visual media items may depict a particular environment or backdrop (e.g., a beach). Various elements comprising the environment may together be termed the scene. Application 120 may recognize the scene depicted in the visual media collection using one or more image analysis techniques. Application 120 may store a scene identifier (e.g., "Beach") in conjunction with the visual media items in database 122. Converter application 116 may be configured to retrieve the scene identifier from database 122 that is stored for the visual media collection items. Converter application 116 may generate scene node 316 to represent the retrieved scene identifier for a visual media collection represented by visual media collection node 302.

Figure 4:
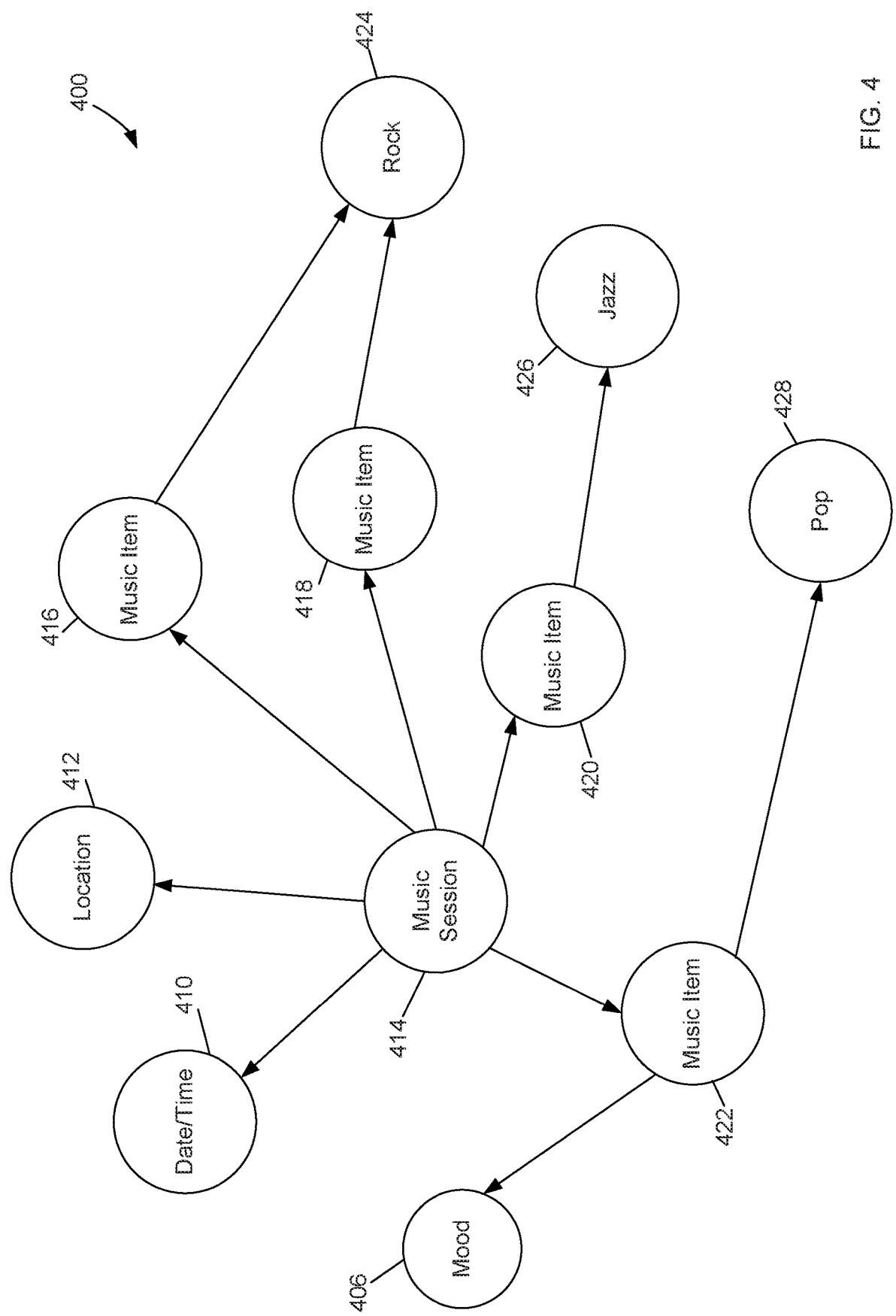
FIG. 4 shows a data representation of a music session node as stored in a database.

FIG. 4 shows a data representation 400 of a music session node 302 as stored in database 114.

In some embodiments, converter application 118 may generate music session 414 using music items received from database 124. For example, a user may use application 126 to store music items in database 124. Application 126 may organize the music items into a collection. For example, application 126 may recognize that the music items were all played in quick succession during a certain period of time. The period of time may be interpreted as a music session.

Converter application 118 may receive the collection of music items and associated metadata (e.g., music metadata node 208, shown in FIG. 2). Converter application 118 may convert the collection of music items into a music session node 414 within database 114. Converter application 118 may also generate nodes for each music item that was included within music session node 414. For example, converter application 118 may determine that four music items were played in close succession, based on timestamp data. Accordingly, converter application 118 may create music item node 416, music item node 418, music item node 420, and music item node 422 for the four music items. Converter application 118 may generate music session node 414 to represent the music session comprising the four music items. Converter application 118 may generate edges to connect music session node 414 with music item node 416, music item node 418, music item node 420, and music item node 422.

Each music item node may be connected to a genre node. As described above, application 126 (shown in FIG. 1) may identify genre information for a music item. Application 126 may store the genre information in database 124. Converter application 118 may retrieve this genre information and convert it from one data format into another data format. For example, converter application 118 may generate one or more genre nodes. For example, converter application 118 may create genre nodes 424, 426, and 428. Converter application 118 may be configured to associate each of music items 416, 418, 420, and 422 with the genre node that represents the music item.

Additionally, converter application 118 may generate nodes relating to metadata for the music items. For example, application 126 may have recognized the date and location at which the music items were played. Application 126 may also have recognized a particular mood for each of the music items and stored these as, for example, music metadata node 208. Accordingly, converter application 118 may generate several nodes representing music metadata node 208. Converter application 118 may generate date/time node 410 and location node 412. Additionally, music item 422 may have a certain mood identifier associated with it in database 122. Converter application 118 may be configured to recognize the associated mood and generate mood node 406 to represent the recognized mood.

As noted above, database 124 may store date and time information for when the music items in a music session were played. Converter application 118 may be configured to generate date/time node 410 in database 114 to represent the abovementioned date and time information. A music session may include multiple music items that were played at different times within a time span. Application 126 may include an associated timestamp at the start of play of each music item, such as "Mar. 20, 2019, 7:13:03 AM". Accordingly, converter application 118 may be configured to generate a date/time node that represents a time range (e.g., 1 hour) that can include the timestamp associated with each music item. For example, one music item may be played at "Mar. 20, 2019, 7:13:03 AM" and another music item may be played at "Mar. 20, 2019, 7:17:08 AM". Converter application 118 may create date/time node 410 to represent "Mar. 20, 2019, 7:00 AM-8:00 AM" and thus encompass the play time for both music items. Converter application 118 may create an edge between date/time node 410 and music session 414 to express that date/time node 410 represents the time range when all the music items in music session 414 were played.

Converter application 118 may also be configured to generate a location node to associate with music session 414. Items in music session 414 may be represented as rows in database 124, with a location column for each row denoting the item play location. Accordingly, converter application 118 may retrieve location data from the location column in database 124 for the music items in music session 414. Converter application 118 may transfer the location data into location node 412 to be stored in database 114. In some embodiments, location node 412 may represent a range of contiguous points rather than the specific pinpoint location at which each music item in the music session was played. For example, application 126 may store a music item's location as a set of geographic coordinates in database 124. Converter application 118 may analyze the geographic coordinates associated with each music item in the music session and determine greatest and least values for the geographic coordinates. Converter application 118 may generate location node 412 for a location range represented by the determined greatest and least values.

Converter application 118 may also be configured to generate mood node 314 using mood identifiers associated with items in music session 414. For example, application 126 may analyze the music items and determine the corresponding mood, as described above. Converter application 118 may be configured to retrieve, from database 124, the mood identifier that corresponds to the music items. Converter application 118 may generate mood node 314 to represent the retrieved mood identifier.

Figure 5:
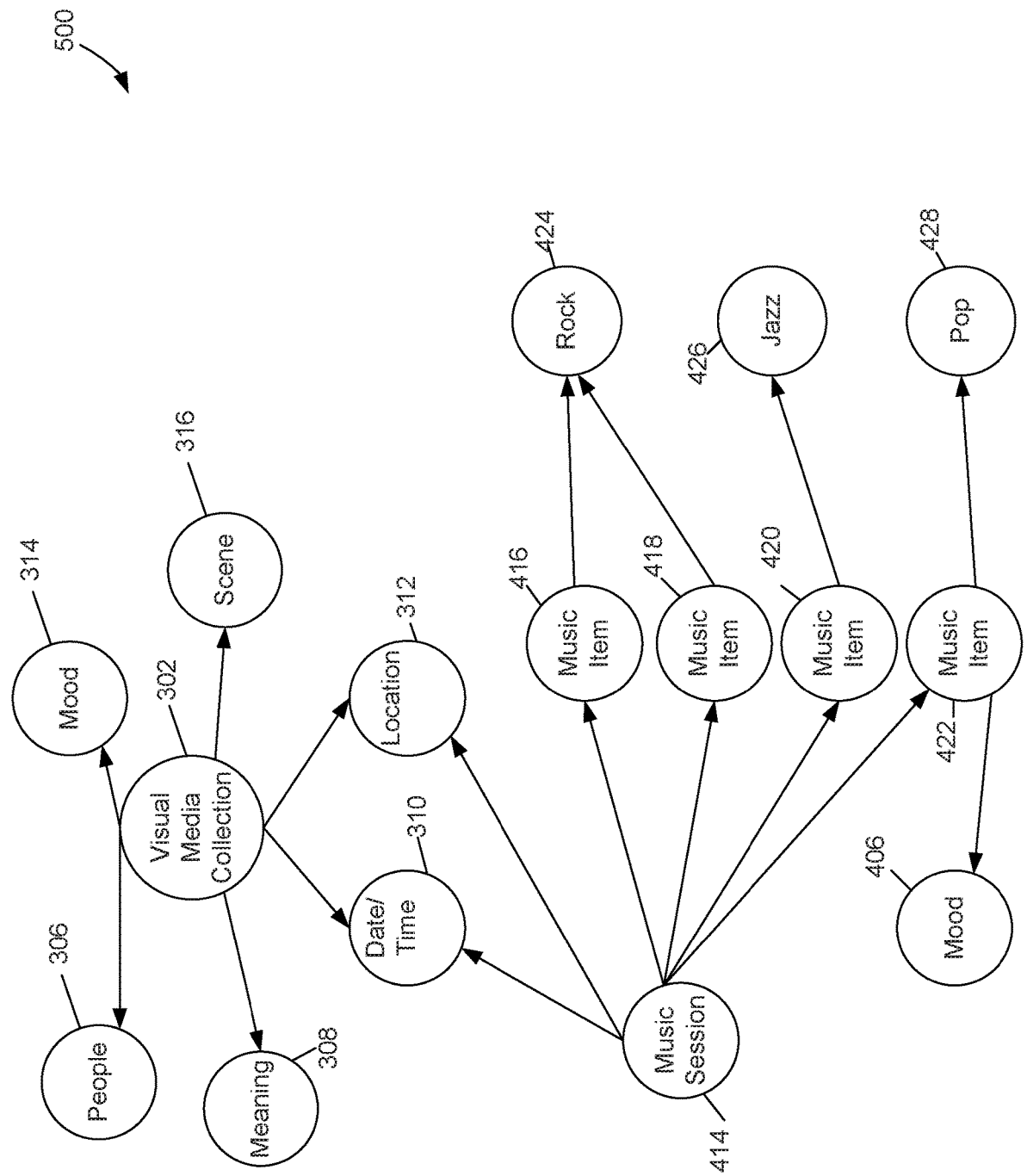
FIG. 5 shows a data representation that illustrates how a visual media collection node and a music session node may be associated with each other in a database.

FIG. 5 is a data representation 500 showing how a visual media collection node and a music session node may be associated with each other in database 114. For example, visual media collection node and music session node may have edges going into the same nodes (e.g., date/time and location nodes). In some embodiments, database manager application 112 may be configured to determine that a visual media collection node and a music session node have edges going to the same node. Database manager application 112 may be configured to generate additional direct edges between visual media collection node and the music session node to indicate additional relationships, as described below with respect to FIGS. 5 and 7-9.

FIG. 5 shows visual media collection node 302. As described above with respect to FIG. 3). Visual media collection node 302 has edges going to people node 306, meaning node 308, date/time node 310, location node 312, mood node 314, and scene node 316. FIG. 5 also shows music session node 414. Music session node 414 may have edges going to music item node 416, music item node 418, music item node 420, and music item node 422. One or more of the music item nodes may have edges to mood nodes. For example, music item node 422 has an edge connecting to mood node 406.

In some embodiments, a music session may overlap with a creation of visual media items. Or the music session may have taken place in proximity of time or location with the creation of some visual media items. For example, a user may take several photos at a birthday party and also play songs at the party. The visual media item creation and play of music items may be close together in time or location. Relatedly, the music play may have occurred well before the creation of visual media items. For example, the user may have played songs at the start of the birthday party and only taken photos nearly an hour later. If there is overlap between the date/time or location for the music session and the date/time or location for the visual media item creation, nodes for the music session and visual media collection may still connect to the same date/time or location nodes in database 114.

As shown in FIG. 5, music session node 414 may have an edge connecting to date/time node 310 and another edge connecting to location node 312. This may indicate that the music session represented by music node 414 was played at a similar time and location as that for the creation of the visual media items represented by visual media collection node 302. As a result, music session node 414 and visual media collection node 302 may have edges connected to the same date/time node 302 and/or the same location node 312.

Once an edge relationship between a visual media collection and a music session is created, database manager application 112 may be configured to generate additional edges. Database manager application 112 may be configured to allow a direct and faster traversal between visual media nodes and music nodes where possible. For example, database manager application 112 may generate a direct edge between music session node 414 and visual media collection node 302. This direct edge may indicate a correlation between the subject music items and visual media items. The correlation may be used to create composite media items. For example, composite media item generator 140 may later use the correlation to select a music item when creating a composite media item that includes visual media items from visual media collection node 302.

In addition, database manager application 112 may generate a direct edge between people node 306 and music session node 414. This may indicate, for example, particular music sessions (and thus music items and genres) that the user prefers to listen to when in the company of a certain person. Database manager application 112 may also be configured to generate a direct edge between meaning node 308 and music session node 414. For example, meaning node 308 may indicate a birthday celebration. The direct edge between meaning node 308 and music session node 414 may indicate that, when celebrating a birthday, the user prefers to listen to particular music items from the music session represented by music session node 414. Database manager application 112 may also be configured to generate a direct edge between scene node 316 and music session node 414. For example, scene node 316 may indicate a beach scene. The direct edge between scene node 316 and music session node 414 may indicate that, when visiting the beach, the user prefers to listen to particular music items from the music session represented by music session node 414.

Figure 6:
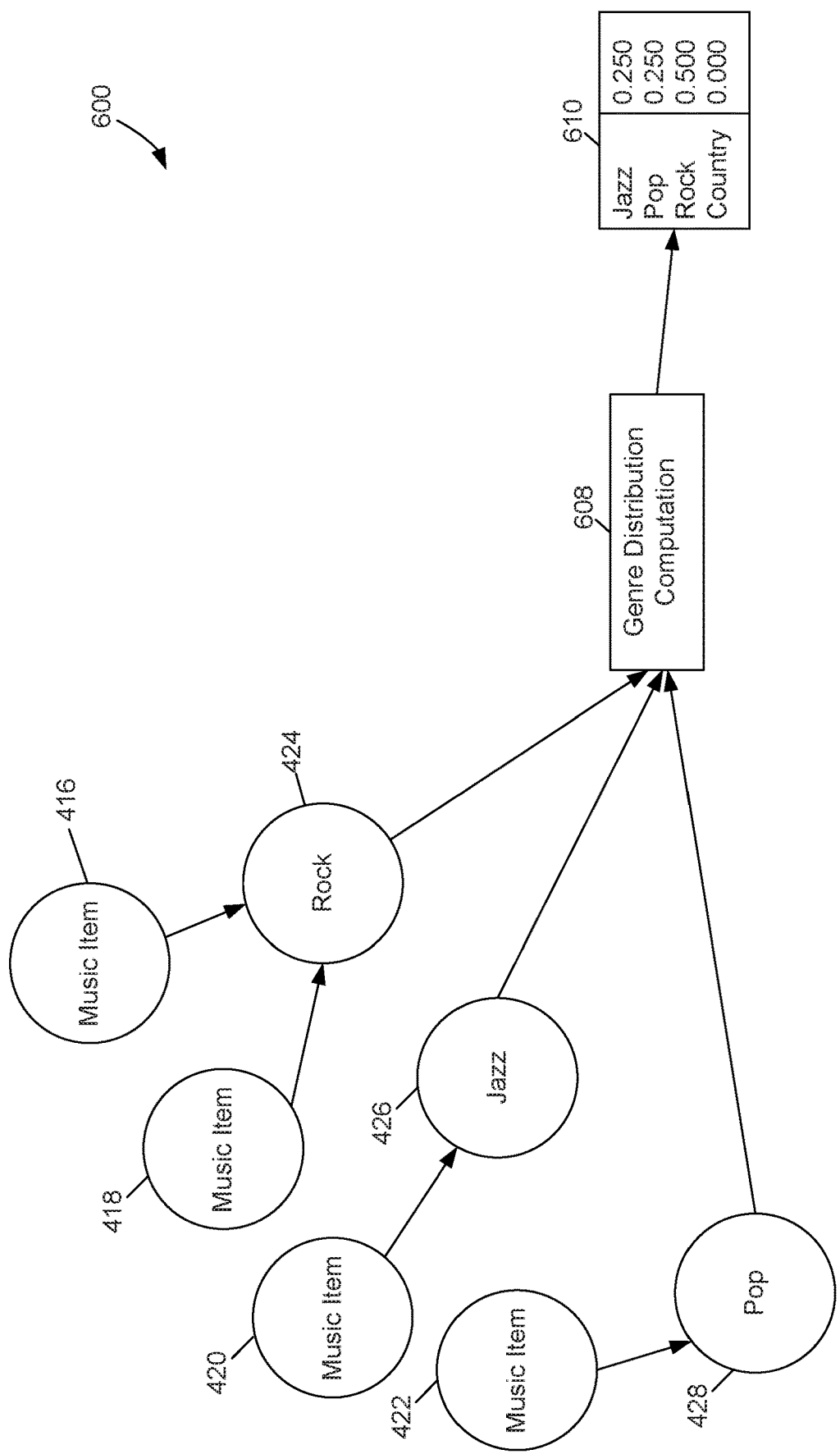
FIG. 6 shows a data representation that illustrates how a database manager application generates a genre distribution from genres associated with music items in a music session.

FIG. 6 is a data representation 600 showing how a database manager application 112 generates a genre distribution from genres associated with music items in a music session.

FIG. 6 shows music item node 416, music item node 418, music item node 420, and music item node 422 (similar to those described above with respect to FIGS. 4 and 5). Music item node 416, music item node 418, music item node 420, and music item node 422 may represent music items that were played within a music session. Alternatively, these music item nodes may represent music items that were played across disparate music sessions or individually at different times. Each music item node may be connected to a genre node. As described above, application 126 (shown in FIG. 1) may identify genre information for a music item. Application 126 may store the genre information in database 124. Converter application 118 may retrieve this genre information and convert it from one database format into another database format. For example, converter application 118 may generate one or more genre nodes.

Accordingly, FIG. 6 shows rock genre node 424, jazz genre node 426, and pop genre node 428. Music item nodes 416 and 418 are connected to rock genre node 424. For example, the music items represented by music item nodes 416 and 418 may belong to the rock genre. Music item 420 is connected to jazz genre node 426. This may indicate that the music item represented by music item node 420 belongs to the jazz genre. Music item 422 is connected to pop genre node 428. This may indicate that the music item represented by music item node 422 belongs to the pop genre.

In some embodiments, database manager application 112 may be configured to perform genre distribution computation 608. Database manager application 112 may be configured to generate a percentage value or other statistical value to denote the frequency with which music items from a certain genre are played. For example, database manager application 112 may count the edges from music items that go into each genre node and divide the count by the total number of edges going into all genre nodes.

Alternatively, database manager application 112 may determine the duration of time that music items from a particular genre are played. For example, music items from a certain genre, such as classical music may be played with less frequency than other genres, such as pop. However, the classical music items may be of much longer duration. The duration that classical music is played may far outweigh the duration that pop music items are played. So classical music may be a more dominant genre in the user's listening preferences. Accordingly, database manager application 112 may be configured to generate a genre distribution that represents the duration that each genre appears in the user's listening patterns.

FIG. 6 shows that, out of the four music nodes, two represent rock music items, one represents a jazz music item, and one represents a pop music item. Accordingly, database manager application 112 may determine that the four music nodes equal 100% or 1.000 unit, rock music items represent two nodes or 50% or 0.500 of a unit whole, jazz music items represent 25% or 0.250 of a unit, and pop music items represent 25% or 0.250 of a unit. Database manager application 112 may be configured to generate genre distribution 610 that reflects the above computation. Database manager application 112 may store genre distribution in database 114 in conjunction with the music session to which the illustrated music nodes belong.

As described above with respect to FIG. 5, database manager application 112 may be configured to generate direct edges between nodes that may not otherwise be connected initially by converter applications 116 and 118. For example, database manager application 112 may generate a direct edge between a person node and a music session node. This may be in response to a determination that the person node connects to a visual media collection node, which is connected to certain date/time and/or location nodes, which are in turn connected to a music session node.

Database manager application 112 may be configured to perform genre distribution computation 608 for a user's historical listening patterns over a period of time, such as 28 days, the past year, a particular month or year in the past, or the like. For example, database manager application 112 may be configured to retrieve or identify all music item nodes or all music session nodes from the past 28 days from database 114.

In another embodiment, database manager application 112 may be configured to identify all music item nodes that are associated with a certain attribute of a visual media collection. For example, as described above with respect to FIG. 5, database manager application 112 may be configured to generate a relationship between a visual media collection and a music session based on a common time or location. As a result, database manager application 112 can generate additional relationships between attributes of the visual media collection (e.g., the meaning or scene or people appearing in the visual media collection) and the music session. Database manager application 112 may then generate a genre distribution associated with the attribute based on music sessions that were played during a certain time period. The time period may be recent, such as the past month, or from the more distant past, such as a period of time from several years ago.

For example, the user may take photos in which the user's friend Joseph appears. Over the past month, the user may have taken several photos with Joseph which may be termed a first visual media collection. Additionally, both the user and Joseph may have attended the same high school some years back, at which time the user may have taken several photos with Joseph that may be termed a second visual media collection. The user may have played a first music session at or near the time the first visual media collection was created and a second music session at or near the time the second visual media collection was created. The contents of the two music sessions may differ significantly, as the user's music genre preferences changed over time. As a result, a first genre distribution created from the first music session may appear very different from a second genre distribution created from the second music session. The two genre distributions may indicate very different proportions of various music genres.

As described above with respect to FIGS. 1 and 2, composite media item generator 140 may be configured to select a music item to associate with a visual media collection, based on a genre distribution of the user's historical listening preferences. In some embodiments, composite media item generator 140 selects different genre distributions based on the different attributes of the visual media collection. The example above of the user and Joseph at different time periods indicates that two different visual media collections were created. Composite media item generator 140 may be configured to select different music items for the two different visual media collections using the two different genre distributions that database manager application 112 created. For example, the first visual media collection was created more recently. The first genre distribution may reflect the user's more current music genre preferences. Accordingly, composite media item generator 140 selects a first music item based on the first genre distribution (created using music heard in the past month) and generates a composite media item using the visual media collection and the selected first music item.

Similarly, the second visual media collection was created earlier, perhaps several years ago. The second genre distribution may reflect the user's older music genre preferences. Accordingly, composite media item generator 140 selects a second music item based on the second genre distribution (created using music heard back when the user and Joseph were in high school together) and generates a composite media item using the visual media collection and the selected second music item.

Figure 7:
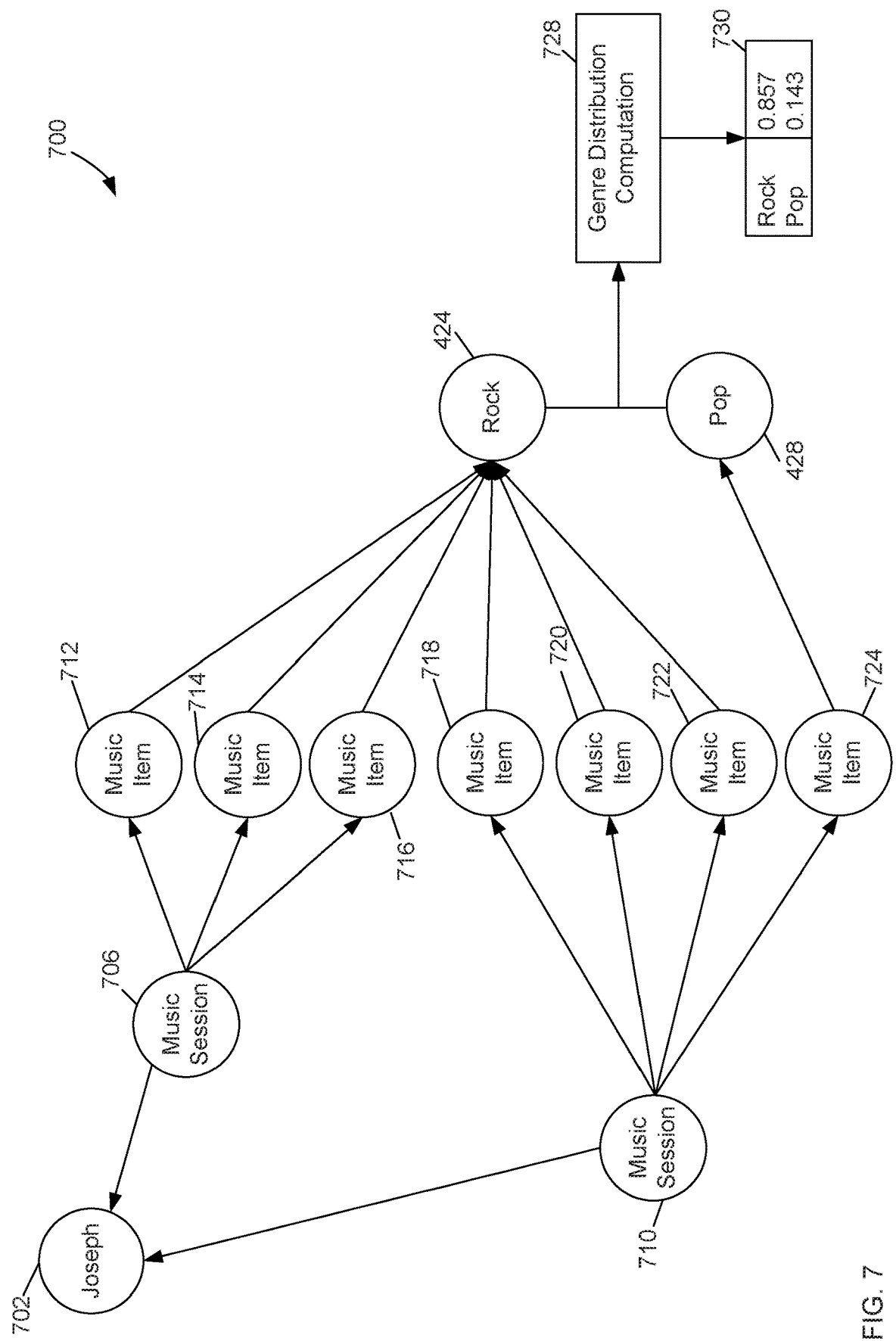
FIG. 7 is a data representation that illustrates how a database manager application identifies new relationships between existing database nodes for a person and a music session.

FIG. 7 is a data representation 700 illustrating how database manager application 112 identifies new relationships between existing database nodes for a person and a music session.

FIG. 7 shows person node 702 connected to two music session nodes 706 and 710. For example, person node 702 may represent the user's friend Joseph. Music session nodes 706 and 710 may represent two music sessions that the user played when in the company of Joseph. More particularly, FIG. 7 illustrates that the user of computing device 110 may have created one or more visual media items. An application (such as application 120, shown in FIG. 1) may recognize that the visual media items include the person named Joseph. The user may have created those visual media items at a certain date/time and/or a certain location. At or around the same date/time and/or location, the user may have played music items from music sessions 706 and 708. Accordingly, database manager application 112 may be configured to determine that the user enjoys music items from music sessions 706 and 708 when in the company of Joseph.

Music session node 706 is connected to music item nodes 712, 714, and 716. Each of music item nodes 712, 714, and 716 is connected to rock genre node 424. Music session node 708 is connected to music item nodes 718, 720, 722, and 724. Each of music item nodes 718, 720, and 722 is connected to rock genre node 424. Music item node 724 is connected to pop genre node 428.

In some embodiments, database manager application 112 may be configured to perform genre distribution computation 728. Database manager application 112 may retrieve music items from music sessions 706 and 708. Database manager application 112 may identify the genre node connected to each music item. Database manager application 112 may count the edges going into each genre node and divide by the total number of edges going into all genre nodes for music sessions 706 and 708.

Database manager application 112 may generate genre distribution 730. In some embodiments, database manager application 112 may be configured to generate genre distribution 730 from a particular period of time, such as the past 28 days or the past month. For example, database manager application 112 may be configured to identify all music sessions the user played over the past 28 days. In other embodiments, database manager application 112 may be configured to generate genre distribution 730 using all music sessions that were played at or near the times or locations when the user took photos with Joseph.

Genre distribution 730 indicates that rock is represented 0.857 units out of 1.000 whole and pop is represented 0.143 units out of 1.000 whole. Accordingly, genre distribution 730 indicates that, when in Joseph's company, the user likes to listen to rock music items 85.7% of the time and pop music items 14.3% of the time.

As described above, composite media item generator 140 may use genre distribution 730 to select a music item to associate with a visual media collection that depicts Joseph. Composite media item generator 140 may not necessarily select a music item that was played in the company of Joseph. Composite media item generator 140 may be configured to select any music item that fits with genre distribution 730. The user may have played the selected music item in Joseph's company, may have played the selected item when not in Joseph's company, or may not have ever played the music item at all.

Relatedly, the user may spend time with Joseph at a later time but play no music at that time. Even if the user plays no music at the later time, database manager application 112 may be configured to provide genre distribution 730 to, for example, composite media item generator 140. Composite media item generator 140 may use the genre distribution to select a music item. The selected music item may be included in a composite media item that includes any visual media items created during the later meeting with Joseph, even if the user played no music at that later time.

Figure 8:
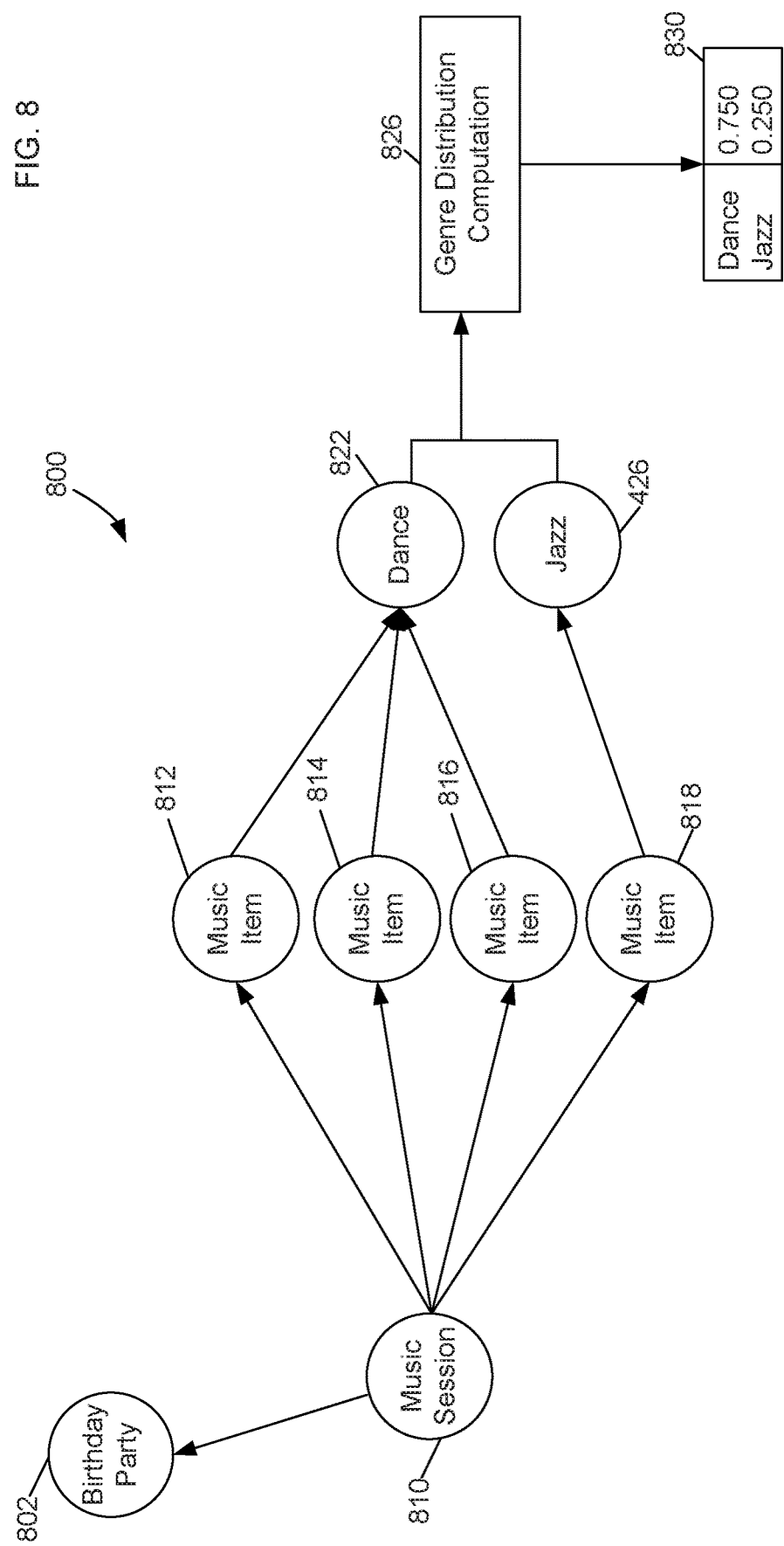
FIG. 8 is a data representation that illustrates how a database manager application identifies new relationships between existing database nodes for a type of meaning and a music session.

FIG. 8 is a data representation 800 showing how a database manager application identifies new relationships between existing database nodes for a type of meaning and a music session.

FIG. 8 shows meaning node 802 connected to music session 810. For example, meaning node 802 may represent visual media items created during birthday celebrations. Music session node 810 may represent a music session that the user played when attending birthday celebrations. More particularly, FIG. 8 illustrates that the user of computing device 110 may have created one or more visual media items. An application (such as application 120, shown in FIG. 1) may recognize that the visual media items represent a birthday celebration. The user may have created those visual media items at a certain date/time and/or a certain location. At or around the same date/time and/or location, the user may have played music items from music session 810. Accordingly, database manager application 112 may be configured to determine that the user enjoys music items from music session 810 when attending birthday celebrations.

Music session node 810 is connected to music item nodes 812, 814, 816, and 818. Each of music item nodes 812, 814, and 816 is connected to dance genre node 822. Music item node 818 is connected to jazz genre node 426.

In some embodiments, database manager application 112 may be configured to perform genre distribution computation 826. Database manager application 112 may retrieve music items from music session 810. Database manager application 112 may identify the genre node connected to each music item in music session 810. Database manager application 112 may count the edges going into each genre node and divide by the total number of edges going into all genre nodes for music session 810. Database manager application 112 may generate genre distribution 830. Genre distribution 830 indicates that dance is represented 0.750 units out of 1.000 whole and jazz is represented 0.250 units out of 1.000 whole. Accordingly, genre distribution 830 indicates that, when attending birthday celebrations, the user likes to listen to dance music items 75% of the time and jazz music items 25% of the time.

Database manager application 112 may generate genre distribution 830. In some embodiments, database manager application 112 may be configured to generate genre distribution 830 from a particular period of time, such as the past 28 days or the past month. For example, database manager application 112 may be configured to identify all music sessions the user played over the past 28 days. In other embodiments, database manager application 112 may be configured to generate genre distribution 830 using all music sessions that were played at or near the times or locations when the user attended birthday parties.

Relatedly, the user may attend a second birthday celebration at a later time but play no music at that time. Even if the user plays no music at the later time, database manager application 112 may be configured to provide genre distribution 830 to, for example, composite media item generator 140. Composite media item generator 140 may use the genre distribution to select a music item. The selected music item may be included in a composite media item that includes any visual media items created during the later birthday celebration, even if the user played no music at that later time. Composite media item generator 140 may select a music item that the user may be unaware of but that matches the genre distribution that is associated with meaning node 802.

Figure 9:
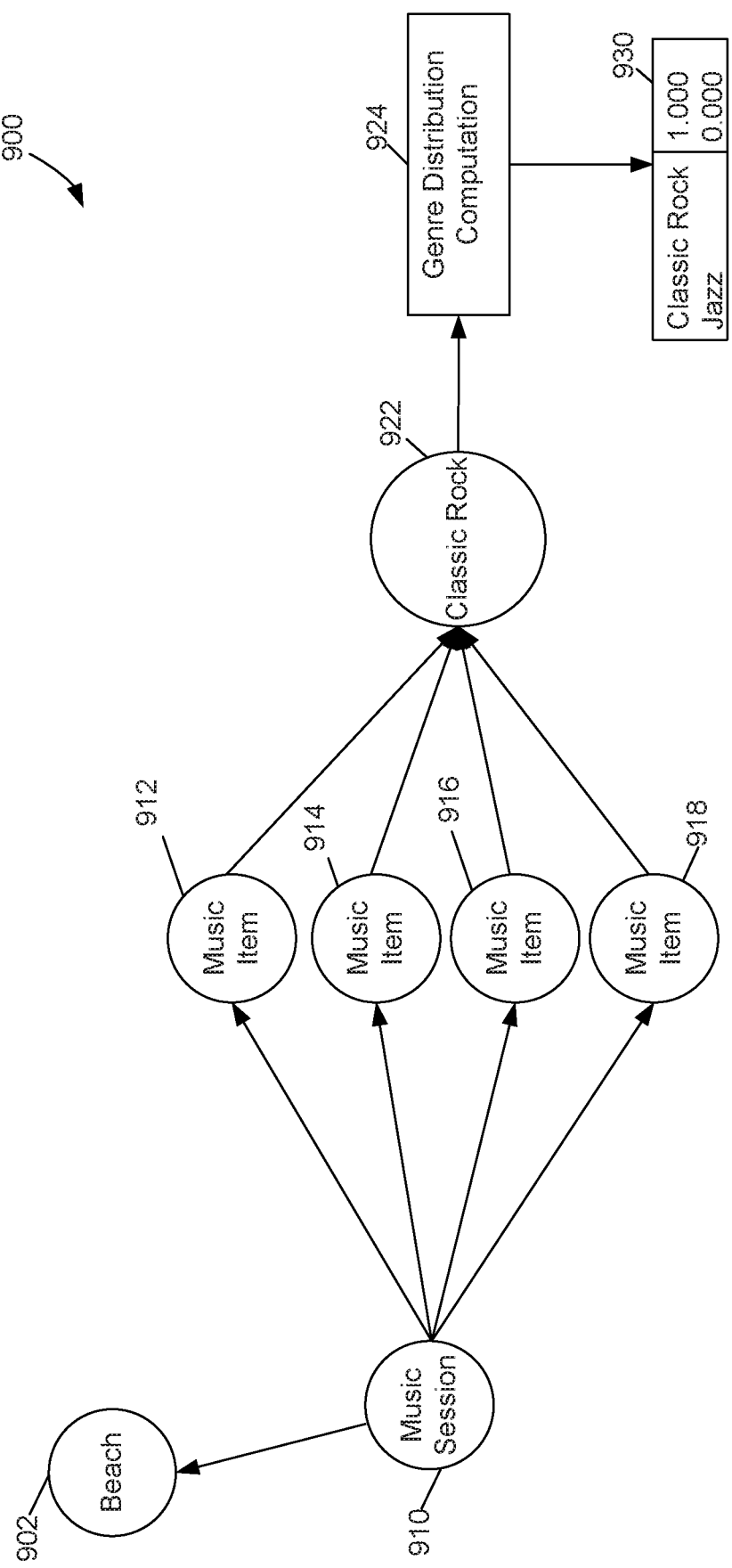
FIG. 9 is a data representation that illustrates how a database manager application identifies new relationships between existing database nodes for a type of scene and a music session.

FIG. 9 is a data representation 900 showing how a database manager application identifies new relationships between existing database nodes for a type of scene and a music session.

FIG. 9 shows scene node 902 connected to music session 910. For example, scene node 902 may represent visual media items created at a beach. Music session node 910 may represent a music session played while the user was at the beach. More particularly, FIG. 9 illustrates that the user of computing device 110 may have created one or more visual media items. An application (such as application 120, shown in FIG. 1) may recognize that the visual media items represent a beach scene. The user may have created those visual media items at a certain date/time and/or a certain location. At or around the same date/time and/or location, the user may have played music items from music session 910. Accordingly, database manager application 112 may be configured to determine that the user enjoys music items from music session 910 when at the beach.

Music session node 910 is connected to music item nodes 912, 914, 916, and 918. Each of music item nodes 912, 914, 916, and 918 is connected to classic rock genre node 922.

In some embodiments, database manager application 112 may be configured to perform genre distribution computation 924. Database manager application 112 may retrieve music items from music session 910. Database manager application 112 may identify the genre node connected to each music item in music session 910. Database manager application 112 may count the edges going into each genre node and divide by the total number of edges going into all genre nodes for music session 910. Database manager application 112 may generate genre distribution 930. Genre distribution 930 indicates that classic rock is represented 1.000 units out of 1.000 whole. In some embodiments, database manager application 112 may indicate genres that have no representation in the distribution. This may indicate to, for example, composite media item generator 140 that the user does not prefer certain genres when at certain scenes. Accordingly, genre distribution 930 indicates that, when at the beach, the user likes to listen to classic rock music items all of the time.

Database manager application 112 may generate genre distribution 930. In some embodiments, database manager application 112 may be configured to generate genre distribution 930 from a particular period of time, such as the past 28 days or the past month. For example, database manager application 112 may be configured to identify all music sessions the user played over the past 28 days. In other embodiments, database manager application 112 may be configured to generate genre distribution 930 using all music sessions that were played at or near the times or locations when the user went to the beach.

Relatedly, the user may visit the beach again at a later time but play no music at that time. Even if the user plays no music at the later time, database manager application 112 may be configured to provide genre distribution 930 to, for example, composite media item generator 140. Composite media item generator 140 may use the genre distribution to select a music item. The selected music item may be included in a composite media item that includes any visual media items created during the later visit to the beach, even if the user played no music at that later time.

Figure 10:
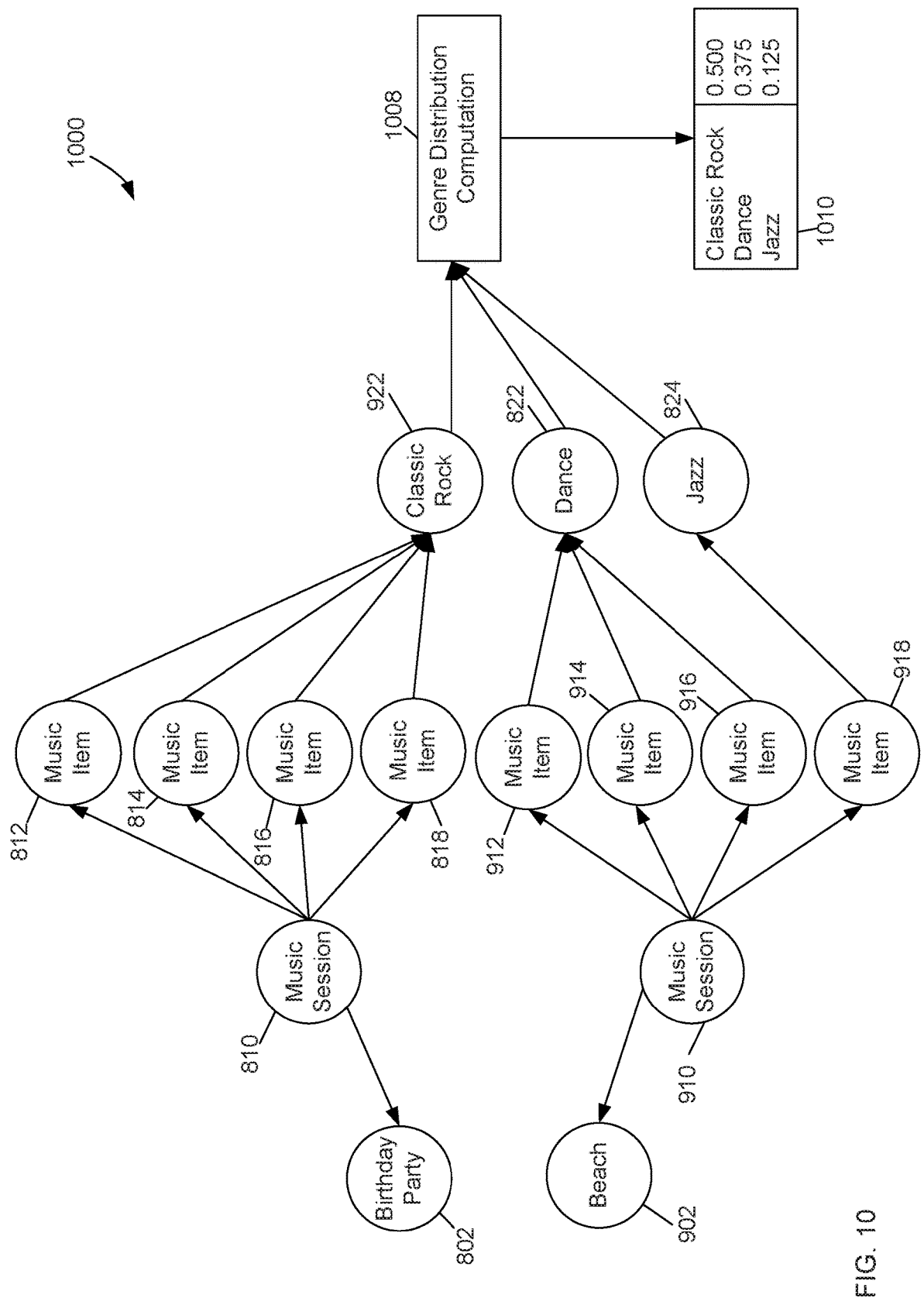
FIG. 10 is a data representation that illustrates how a database manager application identifies new relationships between existing database nodes for a combination of meaning and scene nodes and a number of music sessions.

FIG. 10 is a data representation 1000 illustrates how a database manager application identifies new relationships between existing database nodes for a combination of meaning and scene nodes and a number of music sessions.

FIG. 10 shows meaning node 802 connected to music session 810 and scene node 902 connected to music session 910.

Music sessions 810 and 910 include the music items that were illustrated in FIGS. 8 and 9. Also, each of the respective music item nodes are connected to genre nodes that were illustrated in FIGS. 8 and 9. FIG. 10 illustrates that database manager application 112 may be configured to determine a genre distribution for a combination of elements, such as a scene and a meaning. For example, the user may attend a birthday celebration at a beach. In one embodiment, the user may have played music items according to a combination of the genre distributions depicted in FIGS. 8 and 9. In another embodiment, the user may have previously attended a birthday celebration and separately visited the beach at a much later time and different location. For each instance, database manager application 112 may have generated a genre distribution.

Database manager application 112 may generate genre distribution 1010. In some embodiments, database manager application 112 may be configured to generate genre distribution 1010 from a particular period of time, such as the past 28 days or the past month. For example, database manager application 112 may be configured to identify all music sessions the user played over the past 28 days. In other embodiments, database manager application 112 may be configured to generate genre distribution 1010 using all music sessions that were played at or near the times or locations when the user went to a birthday celebration at the beach.

Later in time, the user may attend a birthday celebration at the beach. The user may not have played music at this event (i.e., birthday at the beach) but may have taken photos. Even if the user plays no music at this current event (birthday at the beach), database manager application 112 may be configured to perform genre distribution computation 1008 to generate genre distribution 1010 which is based on previous genre distributions 830 and 930. For example, database manager application 112 may identify a date/time or location node that connects to the visual media items that depict both the meaning corresponding to a birthday celebration and a scene corresponding to a beach. Subsequently, database manager application 112 may provide the genre distribution to, for example, composite media item generator 140. Composite media item generator 140 may use the genre distribution to select a music item. The selected music item may be included in a composite media item that includes the visual media items created during the birthday celebration at the beach, even if the user played no music concurrently with that event.

As another example, the user may take photos with two different friends, such as Joseph and another person named Sidi. The photos may be collected as a visual media collection. Database manager application 112 may be configured to generate a genre distribution for each of Joseph and Sidi. For example, database manager application 112 may generate the respective genre distributions based on the user's listening patterns at earlier times when the user took photos with each of Joseph and Sidi, or at some earlier time spent with both of them together. Database manager application 112 may identify that the currently generated visual media collection is associated with both the Joseph node and the Sidi node in database 114. Accordingly, database manager application 112 may be configured to generate a combined genre distribution from the genre distributions associated with each of Joseph and Sidi.

Figure 11:
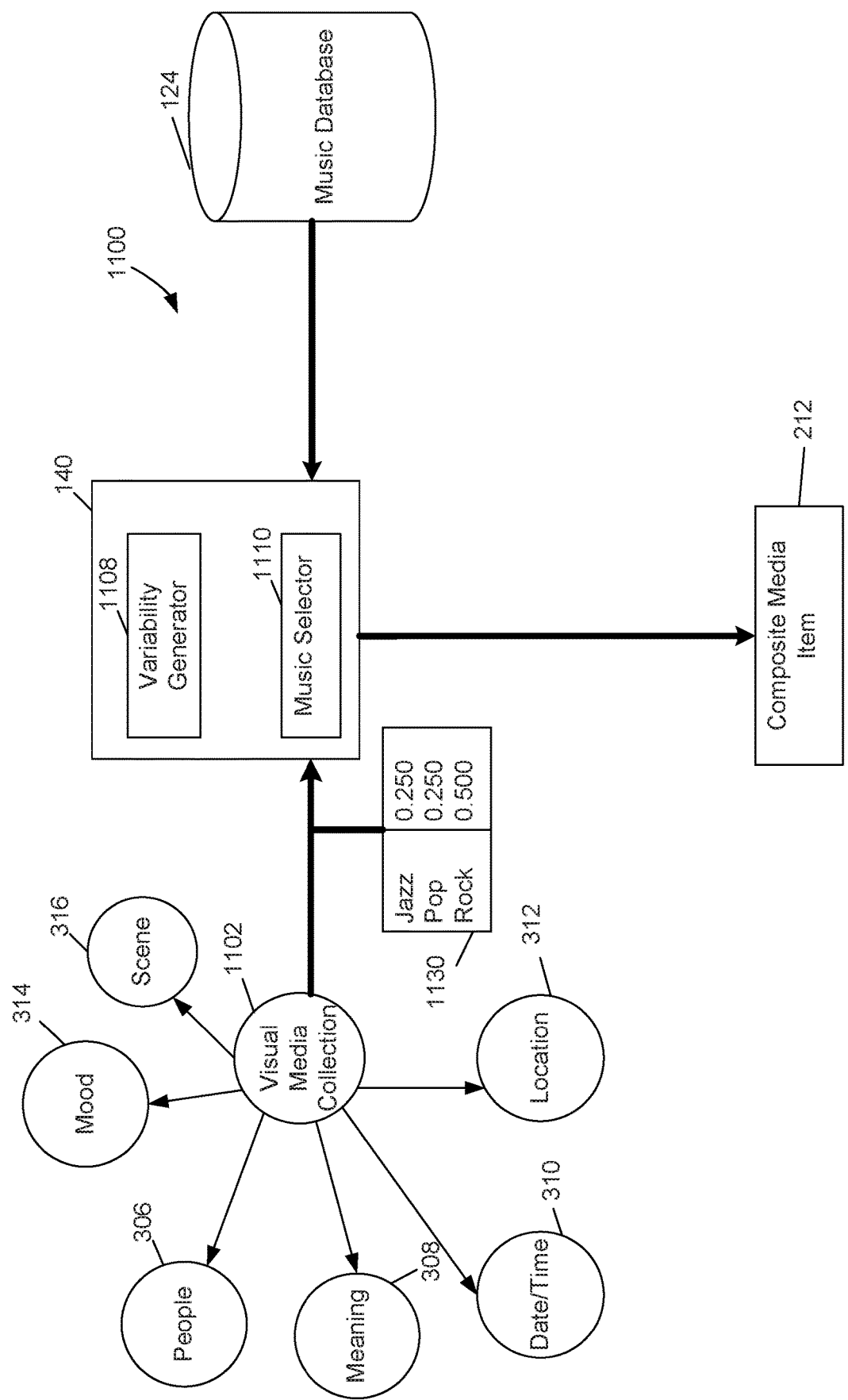
FIG. 11 is a system interaction diagram showing how a composite media item generator generates a composite media item using different data sources.

FIG. 11 is a system interaction diagram 1100 showing how a composite media item generator 140 generates a composite media item using different data sources.

As shown in FIG. 11, composite media item generator 140 receives data from visual media collection node 1102. For example, composite media item generator 140 may retrieve the visual media collection node 1102 from database 114. In some embodiments, composite media item generator 140 retrieves any newly created visual media collection node on a periodic basis. In other embodiments, composite media item generator 140 retrieves a visual media collection node when it detects user input wishing to view the corresponding collection of visual media items. Additionally, composite media item generator 140 may also receive genre distribution computation 1130. In some embodiments, database manager application 112 provides the associated genre distribution computation each time composite media item generator 140 retrieves a visual media collection node.

Visual media collection 1102 may be a recently created visual media collection. For example, the user may have created a number of photos the day before. These photos may depict a person represented by people node 306. Based on historical listening patterns of the user, database manager application 112 may have generated a genre distribution for the particular person. Similarly, the photos may depict a certain meaning represented by meaning node 308 or a certain scene represented by scene node 316. Again, based on the user's past music sessions, database manager application 112 may have generated a genre distribution for the particular meaning or scene now being depicted in the visual media collection.

Based on the previously created genre distributions, database manager application 112 may generate a combined genre distribution 1130. Database manager application 112 may generate a genre distribution 1130 using genre distributions generated for, for example, people 306, scene 316, and/or meaning 308.

As shown in FIG. 11, composite media item generator 140 may include variability generator 1108. Variability generator 1108 may be configured to ensure that the generated composite media items include a variety of music selections and not just repetition of certain music selections. For example, a user may like certain music items or certain genres but may not wish to hear the same music items or the same genre of music items in conjunction with every composite media item the user views. For example, when a composite media item is viewed, variability generator 1108 may assign a negative weighting to the music item. The negative weighting may be provided to music selector 1110 to make it highly unlikely that music selector 1110 will use the music item for the next composite media item. In some embodiments, the negative weighting decays over time. Accordingly, each time music selector 1110 selects that music item again, it is more likely to select that music item as the negative weighting decreases.

As shown in FIG. 11, composite media item generator 140 may include music selector 1110. Music selector 1110 may be configured to select music items to associate with a visual media collection such as the visual media items represented in visual media collection 302. Music selector 1110 may be configured to select music items from database 124. In some embodiments, music selector 1110 may be configured to select one or more music items based on mood, genre distribution, and variability factors provided by variability generator 1108.

As indicated above, genre distribution 1130 may be used to select the music item. In some embodiments, music selector 1110 selects, from music database 124, a music item that corresponds to genre distribution 1130. The user may or may not have previously played the selected item. In this way, music selector 1110 is able to use genre distribution 1130 generated from the user's historical listening patterns to select a music item that is relevant to a current visual media collection of the user.

In some embodiments, music selector 1110 first identifies the mood associated with the visual media collection. For example, music selector 1110 identifies the mood represented by mood node 314 for visual media collection node 1102. Music selector 1110 may be configured to retrieve music items from database 124 that correspond to the identified mood. Music selector 1110 may be configured to then apply genre distribution 1130 to the list of music items that were filtered by mood. For example, music selector 1110 may have a filtered list of music items that include, among other genres, rock music items, jazz music items, and pop music items. In some embodiments, music selector 1110 may be configured to further filter out all music items that do not belong to one of those three genres. Additionally, music selector 1110 may be configured to select a music item based on the genre distribution. For example, music selector 1110 may have a 50% probability of selecting a rock music item, a 25% probability of selecting a jazz music item, and 25% probability of selecting a pop music item.

In some embodiments, music selector 1110 organizes the remaining music items in order. Music selector 1110 may be configured to generate a list of music items that is ranked according to certain criteria. For example, music selector 1110 may rank each music item by whether the user has played it, frequency of play, duration of item, or the like.

In some embodiments, music selector 1110 selects the highest-ranked music item to include within composite media item 212. The highest-ranked music item may be a rock music item because the rock genre has the highest probability of being selected. However, variability generator 1108 may have specified a negative weighting for that selected music item (e.g., because it was recently used). Accordingly, music selector 1110 may be configured to select the second highest-ranked music item. This may also be a rock music item. There may be no negative weighting associated with the second highest-ranked music item.

In some embodiments, composite media item generator 140 generates composite media item 212. Composite media item 212 may include the visual media items represented by visual media collection node 1102 and the music item selected by music selector 1110. Composite media item generator 140 may be configured to generate, for example, an interactive display of the visual media items where the items display one after another in a certain sequence. While the visual media items display, the selected music item plays.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 12:
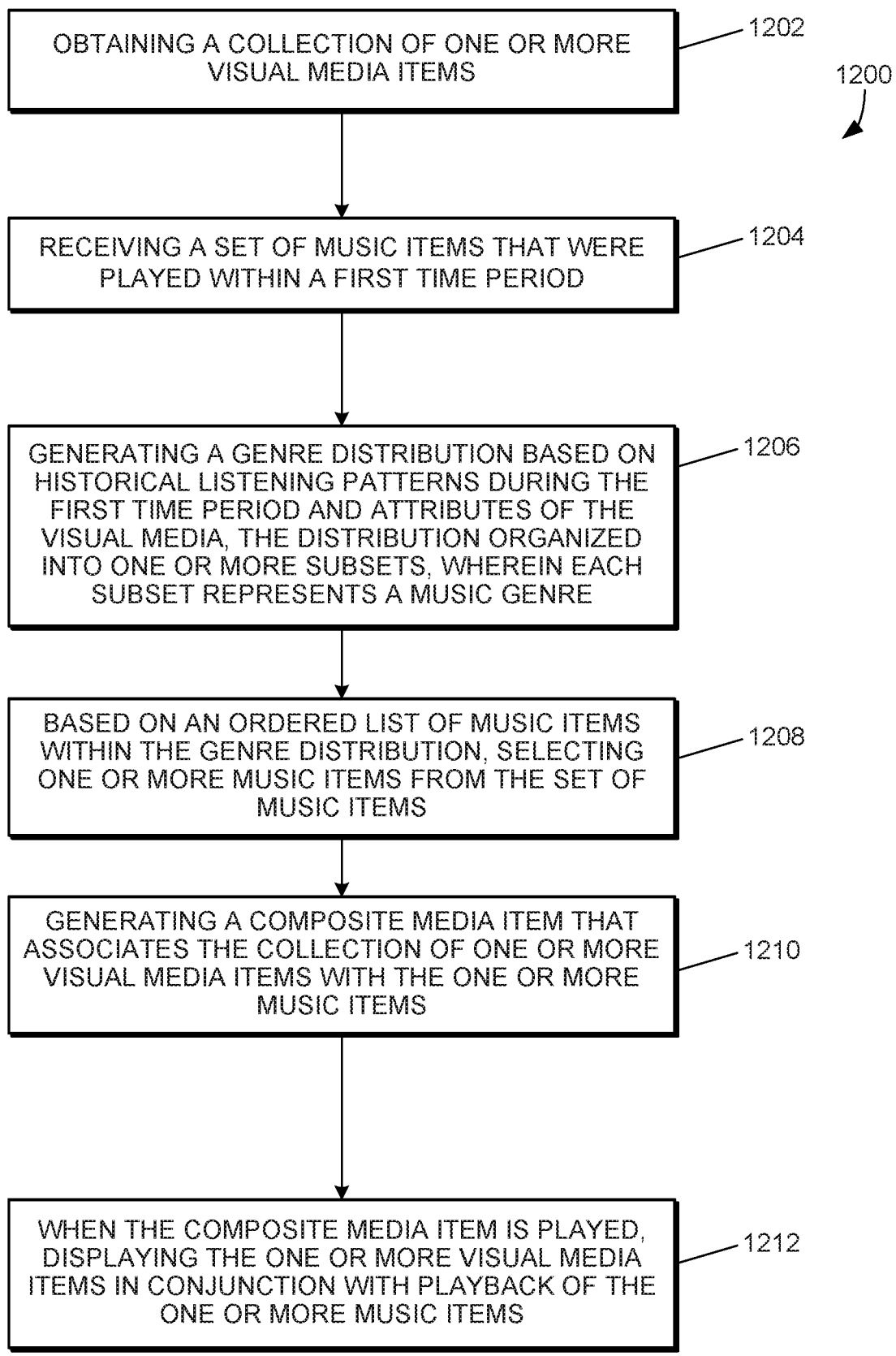
FIG. 12 is a flow diagram of an example process for personalized music selections.

FIG. 12 is a flow diagram 1200 illustrating how composite media item generator 140 generates a composite media item using a set of visual media items and music items.

As shown in FIG. 12, at step 1202, composite media item generator 140 may be configured to obtain a collection of one or more visual media items. In some embodiments, composite media item generator 140 may obtain visual media items from local database 122, as described above with respect to FIG. 1. In other embodiments, composite media item generator 140 may obtain visual media items from a remote device, such as photos and video server device 130, shown in FIG. 1. For example, a user may store previously created visual media items remotely on photos and video server device 130 due to limited storage on computing device 110. In still other embodiments, composite media item generator 140 may obtain visual media items from an external storage device (e.g., an external hard drive). In some embodiments, composite media item generator 140 may be configured to retrieve a selection of visual media items. For example, the user may specify a set of visual media items that the user wishes to view (e.g., those created within the past week).

At step 1204, composite media item generator 140 may be configured to obtain a set of music items that were played within a first time period. For example, composite media item generator 140 may retrieve the last 28 days' worth of music items that were played on computing device 110. In some embodiments, composite media item generator 140 may obtain music items from local database 124, as described above with respect to FIG. 1. In other embodiments, composite media item generator 140 may obtain music items from a remote device, such as music server device 132, shown in FIG. 1. For example, a user may store previously created music items remotely on music server device 132 due to limited storage on computing device 110. In still other embodiments, composite media item generator 140 may obtain music items from an external storage device (e.g., an external hard drive). In some embodiments, composite media item generator 140 may be configured to retrieve a selection of music items. For example, the user may specify a set of music items that are associated with a particular music session. In other embodiments, composite media item generator 140 may be configured to retrieve music items from music sessions that are associated with a particular person, scene, or meaning.

At step 1206, composite media item generator 140 may be configured to generate a genre distribution. As described above with respect to FIGS. 6-9, composite media item generator 140 may generate the genre distribution based on historical listening patterns during the first time period. For example, the genre distribution may represent the user's preferred music items and genres that were heard during the past 28 days. The genre distribution may be organized into one or more subsets, wherein each subset represents a music genre. The genre distribution may reflect the user's preferences in numerical form. For example, the genre distribution may be a frequency distribution showing how frequently the user listened to certain genres of music. The genre distribution may be a distribution of how long a user listened to particular genres.

In some embodiments, the genre distribution may be generated based on certain attributes of the visual media items. For example, the genre distribution may be specific to a certain person (e.g., Joseph as described with respect to FIG. 7). The genre distribution may be specific to a certain meaning (e.g., birthday celebrations as described with respect to FIG. 8). The genre distribution may be specific to a certain scene (e.g., the beach as described with respect to FIG. 9). The genre distribution may also reflect a combination of attributes of the visual media items (e.g., a birthday party at the beach as described with respect to FIG. 10).

At step 1208, composite media item generator 140 may be configured to select one or more music items from the set of music items that were received at step 1204. In some embodiments, composite media item generator 140 may filter the received list of music items by a mood attribute associated with the visual media items. In some embodiments, composite media item generator 140 may then generate an ordered list from the filtered list of music items. For example, composite media item generator 140 may order the filtered list of music items based on the genre distribution, with music items from more preferred genres being placed near the top of the ordered list of music items.

At step 1210, composite media item generator 140 may be configured to generate a composite media item that associates the more visual media items with the selected one or more music items. When the composite media item is played, composite media item generator 140 may be configured to, display, at step 1212, the one or more visual media items in conjunction with playback of the one or more music items.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve personalized music selections. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver personalized music selections. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized music selections, the present technology can be configured to allow users to select to "opt in" or "opt out" of participation in the collection of personal information data during registration for services or anytime thereafter. In another example, users can opt not to provide certain data (e.g., genre identifiers or any expressions of user preference). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, personalized music selections may be based on non-personal information data or a bare minimum amount of personal information, such as the content being requested by the device associated with a user, other non-personal information available to a personalized music selection service or publicly available information.

Example System Architecture

Figure 13:
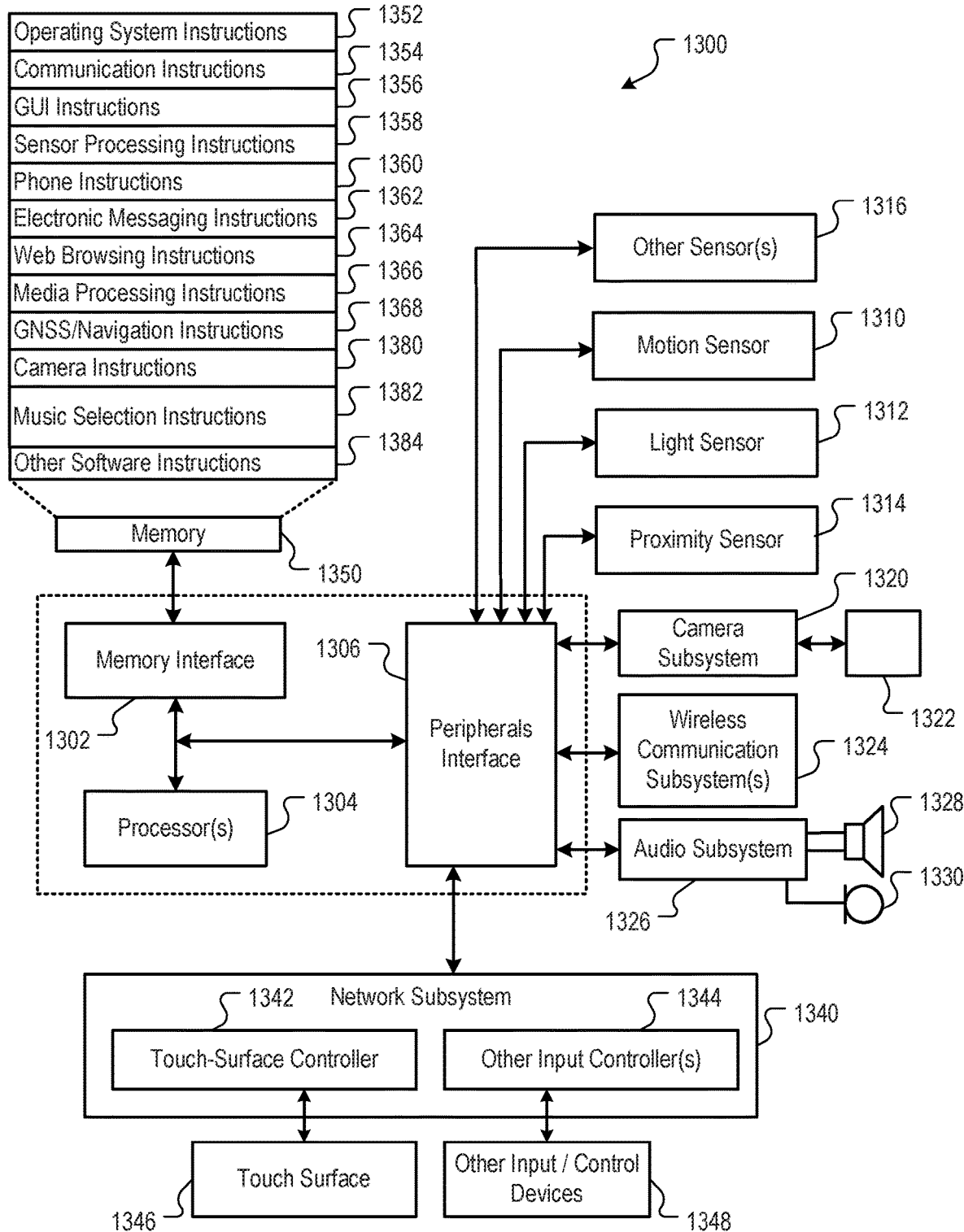
FIG. 13 is a block diagram of an example computing device that can implement the features and processes of FIGS. 1-12.

FIG. 13 is a block diagram of an example computing device 1300 that can implement the features and processes of FIGS. 1-12. The computing device 1300 can include a memory interface 1302, one or more data processors, image processors and/or central processing units 1304, and a peripherals interface 1306. The memory interface 1302, the one or more processors 1304 and/or the peripherals interface 1306 can be separate components or can be integrated in one or more integrated circuits. The various components in the computing device 1300 can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, magnetometer or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network (s) over which the computing device 1300 is intended to operate. For example, the computing device 1300 can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device 100 can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions. The audio subsystem 1326 can be configured to facilitate processing voice commands, voiceprinting and voice authentication, for example.

The I/O subsystem 1340 can include a touch-surface controller 1342 and/or other input controller(s) 1344. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In one implementation, a pressing of the button for a first duration can disengage a lock of the touch surface 1346; and a pressing of the button for a second duration that is longer than the first duration can turn power to the computing device 1300 on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the computing device 1300 can present recorded audio and/or video files, such as MP3, AAC, and MPEG files. In some implementations, the computing device 1300 can include the functionality of an MP3 player, such as an iPod™.

The memory interface 1302 can be coupled to memory 1350. The memory 1350 can include high-speed random-access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the personalized music selection features as described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store software instructions 1372 to facilitate other processes and functions, such as the personalized music selection processes and functions as described with reference to FIGS. 1-12.

The memory 1350 can also store other software instructions 1374, such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the computing device 1300 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method of selecting music for personal media compositions, the method comprising:
   receiving, by a computing device, a first collection of one or more visual media items;
   analyzing the first collection of one or more visual media items to determine one or more attributes of a plurality of attributes of the first collection;
   determining, by the computing device, that a first set of music items was played within a threshold time period of a creation time for the one or more visual media items;
   generating, by the computing device, a plurality of genre distribution values for respective music genres in a plurality of music genres, each genre distribution value representing a proportion of the first set of music items associated with the corresponding music genre;
   based on the determination that the first set of music items was played within the threshold time period, generating, in a data storage of the computing device, a first relationship between the one or more attributes and a music genre associated with one or more of the first set of music items;
   based on the generated first relationship, selecting one or more music items from the first set of music items; and
   generating, by the computing device, a first composite media item that associates the first collection of one or more visual media items with the selected one or more music items.

2. The method of claim 1, further comprising presenting the one or more visual media items in conjunction with playback of the one or more music items as a presentation of the composite media item.

3. The method of claim 1, wherein the genre distribution values include a play frequency for the one or more music items, and wherein the one or more music items include a first music item that corresponds to a music genre that is associated with a first play frequency that is higher than a second play frequency for at least one other music genre.

4. The method of claim 1, further comprising:
   identifying a first attribute of a plurality of attributes of the one or more visual media items;
   identifying the creation time for the one or more visual media items;
   identifying that at least one music item was played within a threshold time period of the identified creation time;
   storing the at least one music item as a first music session.

5. The method of claim 4, further comprising:
   identifying a visual feature associated with the first collection of one or more visual media items; and
   based on the identified visual feature, determining the first attribute of the first collection of the one or more visual media items.

6. The method of claim 4, further comprising:
   identifying one or more keywords associated with the first collection of one or more visual media items; and
   based on the identified keywords, determining the first attribute of the first collection of the one or more visual media items.

7. The method of claim 4, wherein the plurality of attributes includes a person identifier for a person appearing in the one or more visual media items, a meaning identifier for a meaning represented by the one or more visual media items, a scene identifier for a scene represented by the one or more visual media items, and a mood identifier for a mood represented by the one or more visual media items.

8. The method of claim 4, further comprising:
   determining a first genre distribution value associated with the first music session; and
   generating a second relationship between the first attribute and the first genre distribution value associated with the first music session; and
   storing the second relationship in the data storage of the computing device.

9. The method of claim 8, further comprising:
   receiving, by the computing device, a second collection of one or more visual media items;
   for the first attribute of the plurality of attributes, identifying that a first value associated with the first collection matches a second value associated with the second collection;
   based on the first relationship between the one or more attributes and the music genre, selecting one or more music items from the first set of music items; and
   based on the identification, generating, by the computing device, a second composite media item that associates the second collection of one or more visual media items with the one or more music items that were selected based on the relationship.

10. The method of claim 1, further comprising:
    identifying, by the computing device, a second set of music items that have not been played on the computing device; and
    based on the first relationship, selecting one or more music items from the second set of music items; and
    generating, by the computing device, a second composite media item that associates the first collection of one or more visual media items with the one or more music items selected from the second set of music items.

11. The method of claim 1, further comprising:
    identifying a mood that represents the first collection of one or more visual media items; and
    selecting a first music item from the first set of music items based on the genre distribution value and the identified mood.

12. A non-transitory computer-readable medium including one or more sequences of instructions that, when executed by one or more processors, cause the processors to perform operations comprising:
    receiving, by a computing device, a first collection of one or more visual media items;
    analyzing the first collection of one or more visual media items to determine one or more attributes of a plurality of attributes of the first collection;

determining, by the computing device, that a first set of music items was played within a threshold time period of a creation time for the one or more visual media items;

generating, by the computing device, a plurality of genre distribution values for respective music genres in a plurality of music genres, each genre distribution value representing a proportion of the first set of music items associated with the corresponding music genre;

based on the determination that the first set of music items was played within the threshold time period, generating, in a data storage of the computing device, a first relationship between the one or more attributes and a music genre associated with one or more of the first set of music items;

based on the generated first relationship, selecting one or more music items from the first set of music items; and generating, by the computing device, a first composite media item that associates the first collection of one or more visual media items with the selected one or more music items.

13. The non-transitory computer-readable medium of claim 12, wherein the instructions further cause the processors to perform operations comprising presenting the one or more visual media items in conjunction with playback of the one or more music items as a presentation of the composite media item.

14. The non-transitory computer-readable medium of claim 12,
wherein the genre distribution values include a play frequency for the one or more music items, and wherein the one or more music items include a first music item that corresponds to a music genre that is associated with a first play frequency that is higher than a second play frequency for at least one other music genre.

15. The non-transitory computer-readable medium of claim 12, wherein the instructions further cause the processors to perform operations comprising:
identifying a first attribute of a plurality of attributes of the one or more visual media items;
identifying the creation time for the one or more visual media items;
identifying that at least one music item was played within a threshold time period of the identified creation time;
storing the at least one music item as a first music session.

16. The non-transitory computer-readable medium of claim 15, wherein the instructions further cause the processors to perform operations comprising:
identifying a visual feature associated with the first collection of one or more visual media items; and
based on the identified visual feature, determining the first attribute of the first collection of the one or more visual media items.

17. The non-transitory computer-readable medium of claim 15, wherein the instructions further cause the processors to perform operations comprising:
identifying one or more keywords associated with the first collection of one or more visual media items; and
based on the identified keywords, determining the first attribute of the first collection of the one or more visual media items.

18. The non-transitory computer-readable medium of claim 15, wherein the plurality of attributes includes a person identifier for a person appearing in the one or more visual media items, a meaning identifier for a meaning represented by the one or more visual media items, a scene identifier for a scene represented by the one or more visual media items, and a mood identifier for a mood represented by the one or more visual media items.

19. The non-transitory computer-readable medium of claim 15, wherein the instructions further cause the processors to perform operations comprising:
determining a first genre distribution value associated with the first music session; and
generating a second relationship between the first attribute and the first genre distribution value associated with the first music session; and
storing the relationship in the data storage of the computing device.

20. The non-transitory computer-readable medium of claim 19, wherein the instructions further cause the processors to perform operations comprising:
receiving, by the computing device, a second collection of one or more visual media items;
for the first attribute of the plurality of attributes, identifying that a first value associated with the first collection matches a second value associated with the second collection;
based on the first relationship between the one or more attributes and the music genre, selecting one or more music items from the first set of music items; and
based on the identification, generating, by the computing device, a second composite media item that associates the second collection of one or more visual media items with the one or more music items that were selected based on the relationship.

21. The non-transitory computer-readable medium of claim 12, wherein the instructions further cause the processors to perform operations comprising:
identifying, by the computing device, a second set of music items that have not been played on the computing device; and
based on the first relationship, selecting one or more music items from the second set of music items; and
generating, by the computing device, a second composite media item that associates the collection of one or more visual media items with the one or more music items selected from the second set of music items.

22. The non-transitory computer-readable medium of claim 12, wherein the instructions further cause the processors to perform operations comprising:
identifying a mood that represents the first collection of one or more visual media items; and
selecting a first music item from the first set of music items based on the genre distribution value and the identified mood.

23. A system comprising:
one or more processors of a computing device; and
a non-transitory computer-readable medium of the computing device including one or more sequences of instructions that, when executed by one or more processors, cause the processors to perform operations comprising:
receiving, by a computing device, a first collection of one or more visual media items;
analyzing the first collection of one or more visual media items to determine one or more attributes of a plurality of attributes of the first collection;
determining, by the computing device, that a first set of music items was played within a threshold time period of a creation time for the one or more visual media items;
generating, by the computing device, a plurality of genre distribution values for respective music genres in a plurality of music genres, each genre distribution value representing a proportion of the first set of music items associated with the corresponding music genre;

based on the determination that the first set of music items was played within the threshold time period, generating, in a data storage of the computing device, a first relationship between the one or more attributes and a music genre associated with one or more of the first set of music items;

based on the generated first relationship, selecting one or more music items from the first set of music items; and generating, by the computing device, a first composite media item that associates the first collection of one or more visual media items with the selected one or more music items.

24. The system of claim 23, wherein the instructions further cause the processors to perform operations comprising presenting the one or more visual media items in conjunction with playback of the one or more music items as a presentation of the composite media item.

25. The system of claim 23, wherein the instructions further cause the processors to perform operations comprising:

wherein the genre distribution values include a play frequency for the one or more music items, and wherein the one or more music items include a first music item that corresponds to a music genre that is associated with a first play frequency that is higher than a second play frequency for at least one other music genre.

26. The system of claim 23, wherein the instructions further cause the processors to perform operations comprising:

identifying a first attribute of a plurality of attributes of the one or more visual media items;

identifying the creation time for the one or more visual media items;

identifying that at least one music item was played within a threshold time period of the identified creation time;

storing the at least one music item as a first music session.

27. The system of claim 26, wherein the instructions further cause the processors to perform operations comprising:

identifying a visual feature associated with the first collection of one or more visual media items; and based on the identified visual feature, determining the first attribute of the first collection of the one or more visual media items.

28. The system of claim 26, wherein the instructions further cause the processors to perform operations comprising:

identifying one or more keywords associated with the first collection of one or more visual media items; and based on the identified keywords, determining the first attribute of the first collection of the one or more visual media items.

29. The system of claim 26, wherein the plurality of attributes includes a person identifier for a person appearing in the one or more visual media items, a meaning identifier for a meaning represented by the one or more visual media items, a scene identifier for a scene represented by the one or more visual media items, and a mood identifier for a mood represented by the one or more visual media items.

30. The system of claim 26, wherein the instructions further cause the processors to perform operations comprising:

determining a first genre distribution value associated with the first music session; and generating a second relationship between the first attribute and the first genre distribution value associated with the first music session; and storing the relationship in the data storage of the computing device.

31. The system of claim 30, wherein the instructions further cause the processors to perform operations comprising:

receiving, by the computing device, a second collection of one or more visual media items;

for the first attribute of the plurality of attributes, identifying that a first value associated with the first collection matches a second value associated with the second collection;

based on the first relationship between the one or more attributes and the music genre, selecting one or more music items from the first set of music items; and based on the identification, generating, by the computing device, a second composite media item that associates the second collection of one or more visual media items with the one or more music items that were selected based on the relationship.

32. The system of claim 23, wherein the instructions further cause the processors to perform operations comprising:

identifying, by the computing device, a second set of music items that have not been played on the computing device; and based on the first relationship, selecting one or more music items from the second set of music items; and generating, by the computing device, a second composite media item that associates the first collection of one or more visual media items with the one or more music items selected from the second set of music items.

33. The system of claim 23, wherein the instructions further cause the processors to perform operations comprising:

identifying a mood that represents the first collection of one or more visual media items; and selecting a first music item from the first set of music items based on the genre distribution value and the identified mood.

* * * * *